US00RE50644E

(19) United States
(12) Reissued Patent
Kobayashi et al.

(10) Patent Number: US RE50,644 E
(45) Date of Reissued Patent: Oct. 21, 2025

(54) LIQUID EJECTION HEAD AND RECORDING DEVICE

(71) Applicant: KYOCERA Corporation, Kyoto (JP)

(72) Inventors: Hiroki Kobayashi, Minamikoma-gun (JP); Kenko Gejima, Kirishima (JP)

(73) Assignee: Kyocera Corporation, Kyoto (JP)

(21) Appl. No.: 18/675,692

(22) Filed: May 28, 2024

Related U.S. Patent Documents

Reissue of:
(64) Patent No.: 11,351,782
Issued: Jun. 7, 2022
Appl. No.: 17/264,339
PCT Filed: Jul. 29, 2019
PCT No.: PCT/JP2019/029631
§ 371 (c)(1),
(2) Date: Jan. 29, 2021
PCT Pub. No.: WO2020/027040
PCT Pub. Date: Feb. 6, 2020

(30) Foreign Application Priority Data

Jul. 31, 2018 (JP) ..... 2018-143815

(51) Int. Cl.
*B41J 2/14* (2006.01)
*B41J 11/00* (2006.01)

(52) U.S. Cl.
CPC ..... *B41J 2/14201* (2013.01); *B41J 11/002* (2013.01)

(58) Field of Classification Search
CPC ..... B41J 2/14–2002/14491
See application file for complete search history.

(56) References Cited

U.S. PATENT DOCUMENTS 7,794,062 B2 * 9/2010 Ito ..... B41J 2/14209 347/68
7,896,478 B2 * 3/2011 Kojima ..... B41J 2/14209 347/85
2017/0217172 A1 * 8/2017 Naganuma ..... B41J 2/0453

FOREIGN PATENT DOCUMENTS

JP 2007-320171 A 12/2007

* cited by examiner

*Primary Examiner* — William E Dondero
(74) *Attorney, Agent, or Firm* — Volpe Koenig

(57) ABSTRACT

A liquid ejection head having a channel member which includes an ejection hole surface and a pressurization chamber surface opposite thereto. An actuator substrate overlaps the pressurization chamber surface. The channel member includes a plurality of ejection holes opening in the ejection hole surface, a plurality of pressurization chambers individually communicating with the plurality of ejection holes and arranged in plan view of the pressurization chamber surface, and a plurality of dummy pressurization chambers positioned outside of the predetermined region in plan view of the pressurization chamber surface. The actuator substrate includes a plurality of pressurization portions that individually pressurize the pressurization chambers, and a plurality of dummy pressurization portions that individually pressurize the dummy pressurization chambers. The dummy pressurization chambers communicate with each other via a plurality of communication paths. A closed space including the plurality of dummy pressurization chambers and the plurality of communication paths is hermetically closed.

23 Claims, 14 Drawing Sheets

LIQUID EJECTION HEAD AND RECORDING DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

The present disclosure relates to a liquid ejection head and a recording device.

BACKGROUND ART

Examples of print heads known to date include a liquid ejection head that performs various printing operations by ejecting a liquid onto a recording medium. The liquid ejection head includes, for example, a plurality of ejection holes and a plurality of pressurization chambers individually connected to the plurality of ejection holes, and liquid droplets are ejected from the plurality of ejection holes when pressure is applied to the inside of the plurality of pressurization chambers. PTL 1 describes a liquid ejection head in which dummy pressurization chambers, which do not contribute to ejection of liquid droplets, are disposed on both sides in a direction in which pressurization chambers are arranged. The dummy pressurization chambers on both sides are connected to communication paths that are open to the atmosphere.

CITATION LIST

Patent Literature

PTL 1: Japanese Unexamined Patent Application Publication No. 2007-320171

SUMMARY OF INVENTION

A liquid ejection head according to an aspect of the present disclosure includes a channel member and an actuator substrate. The channel member includes a first surface and a second surface opposite thereto. The actuator substrate overlaps the second surface. The channel member includes a plurality of ejection holes, a plurality of pressurization chambers, and a plurality of dummy pressurization chambers. The plurality of ejection holes opens in the first surface. The plurality of pressurization chambers individually communicates with the plurality of ejection holes and is arranged in a predetermined region in plan view of the second surface. The plurality of dummy pressurization chambers is positioned outside of the predetermined region in plan view of the second surface. The actuator substrate includes a plurality of pressurization portions that individually pressurizes the plurality of pressurization chambers, and a plurality of dummy pressurization portions that individually pressurizes the plurality of dummy pressurization chambers. The plurality of dummy pressurization chambers communicates with each other via a plurality of communication paths. A closed space including the plurality of dummy pressurization chambers and the plurality of communication paths is hermetically closed.

A recording device according to an aspect of the present disclosure includes the liquid ejection head described above and a movement unit that moves the liquid ejection head and a recording medium relative to each other.

DESCRIPTION OF EMBODIMENTS

Hereafter, embodiments of the present disclosure will be described with reference to the drawings. Figures used in the following description are schematic; and dimensions, ratios, and the like in the figures do not necessarily coincide with actual ones. Between a plurality of figures illustrating the same member, dimensions, ratios, and the like in the figures do not necessarily coincide with each other in order to exaggerate shapes and the like.

[Overall Structure of Printer]

Figure 1A:
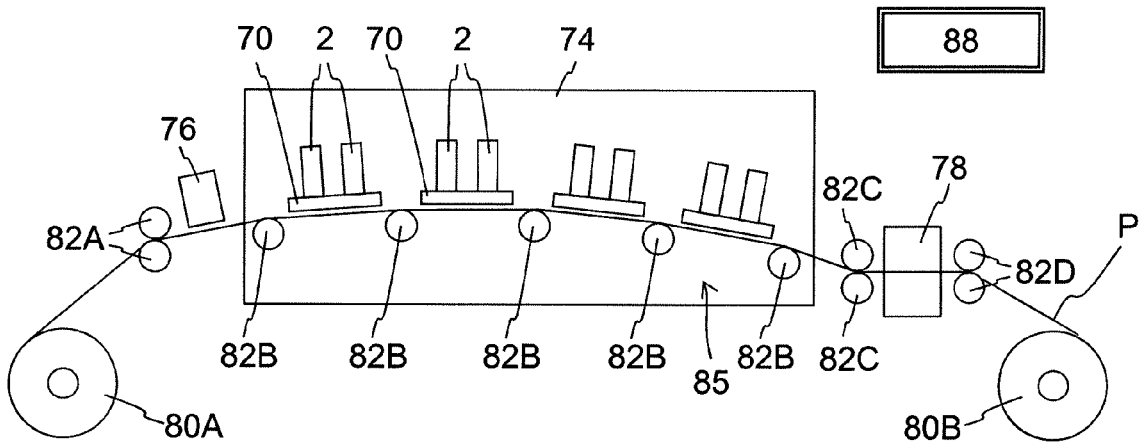
FIG. 1A and FIG. 1B are a side view and a plan view of a recording device including liquid ejection heads each according to an embodiment of the present disclosure.
Figure 1B:
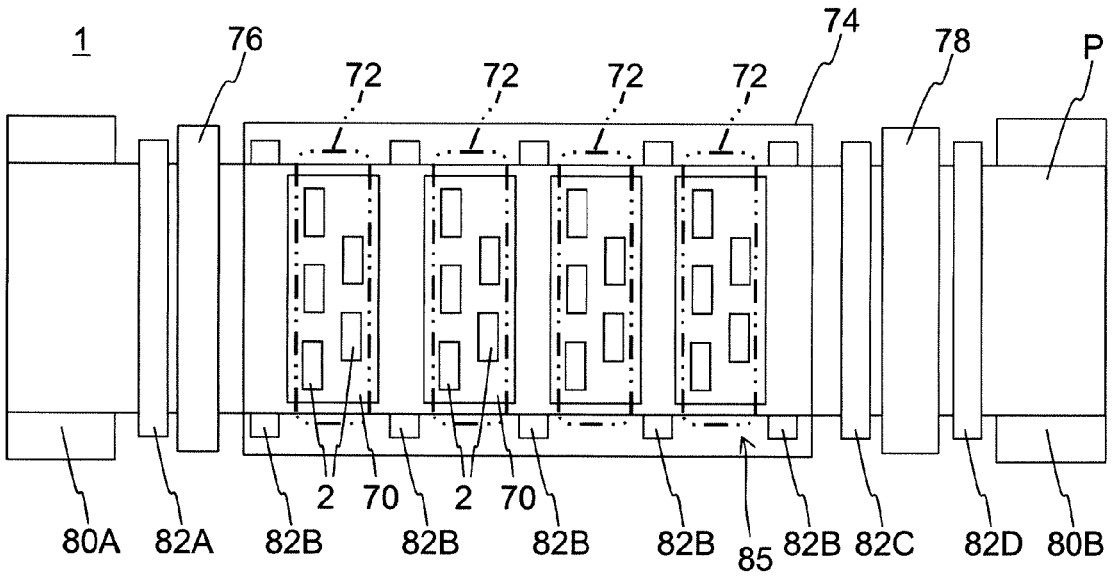

FIG. 1A is a schematic side view and FIG. 1B is a schematic plan view of a color inkjet printer 1 (hereafter simply referred to as "printer") that is a recording device including liquid ejection heads 2 (hereafter each simply referred to as "head") each according to an embodiment of the present disclosure. The printer 1 moves the print sheet P, which is a recording medium, relative to the heads 2 by transporting the print sheet P from a feed roller 80A to a take-up roller 80B. The feed roller 80A, the take-up roller 80B, and various rollers described below constitute a movement unit 85 that moves the print sheet P and the heads 2 relative to each other. A controller 88 controls the heads 2 based on print data that is data of images, characters, and the like; causes the heads 2 to eject liquid toward the print sheet P; causes liquid droplets to land on the print sheet P; thereby performing recording, such as printing, on the print sheet P.

In the present embodiment, the heads 2 are fixed to the printer 1, and the printer 1 is a so-called line printer.

Examples of another embodiment of a recording device include a so-called serial printer that moves the heads 2 by reciprocating the heads 2 in a direction that intersects the transport direction of the print sheet P, such as a direction that is substantially perpendicular to the transport direction, and that alternately performs an operation of ejecting liquid droplets and an operation of transporting the print sheet P while moving the heads 2.

In the printer 1, four head mount frames 70 (hereafter each simply referred to as "frame"), each having a flat-plate-like shape, are fixed substantially parallel to the print sheet P. Each frame 70 has five holes (not shown), and five heads 2 are mounted at portions of respective holes. The five heads 2 mounted on one frame 70 constitute one head group 72. The printer 1 includes four head groups 72, and twenty heads 2 are mounted in total.

Liquid ejection portions of the heads 2 mounted on the frames 70 face the print sheet P. The distance between the heads 2 and the print sheet P is, for example, about 0.5 to 20 mm.

The twenty heads 2 may be connected to the controller 88 directly or via a distributor that distributes print data. For example, the controller 88 may send print data to one distributer, and the one distributer may distribute the print data to the twenty heads 2. Alternatively, for example, the controller 88 may distribute print data to four distributers that correspond to the four head groups 72, and each distributer may distribute print data to the five heads 2 in the corresponding head group 72.

Each head 2 has a shape that is elongated in a direction from the front side toward the back side of FIGS. 1A and 1n the up-down direction of FIG. 1B. In one head group 72, three heads are arranged in a direction that intersects the transport direction of the print sheet P, such as a direction substantially perpendicular to the transport direction; and the other two heads 2 are arranged respectively at positions that are between the three heads 2 and that are displaced in the transport direction. In other words, in one head group 72, the heads 2 are disposed in a staggered pattern. The heads 2 are disposed in such a way that areas on which the heads 2 can perform printing are connected in the width direction of the print sheet P, that is, in a direction that intersects the transport direction of the print sheet P or ends of the areas overlap, and the heads 2 can perform printing without a gap in the width direction of the print sheet P.

The four head groups 72 are disposed along the transport direction of the print sheet P. To each head 2, a liquid such as an ink is supplied from a liquid supply tank (not shown). The same color ink is supplied to the heads 2 included in one head group 72, and the four head groups 72 can perform printing by using four colors of ink. The colors of ink ejected from the head groups 72 are, for example, magenta (M), yellow (Y), cyan (C), and black (K). It is possible to print a color image by controlling such colors of ink with the controller 88.

The number of heads 2 mounted on the printer 1 may be one, provided that monochrome printing is to be performed on an area that can be printed with one head 2. The number of heads 2 included in each head group 72 and the number of head groups 72 may be changed as appropriate in accordance with an image to be printed and printing conditions. For example, the number of head groups 72 may be increased in order to perform printing with a larger number of colors. Even when heads 2 having the same performance are used, the transport speed can be increased by disposing a plurality of head groups 72 that perform printing using the same color and performing printing alternately in the transport direction. Thus, it is possible to increase the print area per unit time. Resolution in the width direction of the print sheet P may be increased by preparing a plurality of head groups 72 that performs printing by using the same color and disposing the head groups 72 to be displaced in a direction that intersects the transport direction.

Moreover, in addition to performing printing using color ink, in order to perform surface treatment of the print sheet P, the heads 2 may perform printing by using a liquid, such as a coating agent, uniformly or with patterning. As the coating agent, for example, when using a recording medium into which liquid does not easily permeate, a coating agent that forms a liquid receiving layer can be used so that the liquid can be easily fixed. As the coating agent, for another example, when using a recording medium into which liquid permeates easily, a coating agent that forms a liquid permeation suppressing layer can be used so that bleeding of the liquid does not become too large and so that a liquid is not mixed with another liquid that has landed on an adjacent part. Instead of being printed by the heads 2, the coating agent may be uniformly applied by a coater 76 that is controlled by the controller 88.

The printer 1 performs printing on the print sheet P, which is a recording medium. The print sheet P is wound around the feed roller 80A; and the print sheet P fed from the feed roller 80A passes below the heads 2 mounted on the frames 70, then passes through a gap between two transport rollers 82C, and is finally taken up by the take-up roller 80B. During printing, the print sheet P is transported at a constant speed as the transport rollers 82C are rotated, and the heads 2 perform printing on the print sheet P.

Next, details of the printer 1 will be described in order in which the print sheet P is transported. The print sheet P fed from the feed roller 80A passes through a gap between the two guide rollers 82A, and then passes below the coater 76. The coater 76 applies the aforementioned coating agent to the print sheet P.

Next, the print sheet P enters a head chamber 74 that accommodates the frames 70 on which the heads 2 are mounted. The head chamber 74 is a space that is substantially isolated from the outside, except that a part of the head chamber 74, such as an inlet and outlet for the print sheet P, is connected to the outside. As necessary, control factors such as the temperature, the humidity, and the air pressure of the head chamber 74 are controlled by the controller 88 and the like. The range of variation in the control factors in the head chamber 74 can be made smaller than those of the outside where the printer 1 is installed, because the effect of disturbance in the head chamber 74 is smaller than that of the outside.

Five guide rollers 82B are disposed in the head chamber 74, and the print sheet P is transported over the guide rollers 82B. In a side view, the five guide rollers 82B are disposed in such a way that the center thereof is convex in the direction in which the frames 70 are disposed. Thus, in a side view, the print sheet P, which is transported over the five guide rollers 82B, has an arc shape; and a tension is applied to the print sheet P so that the print sheet P between each pair of the guide rollers 82B becomes flat. One frame 70 is disposed between each pair of guide rollers 82B. The frames 70 are installed at slightly different angles in such a way that each frame 70 is parallel to the print sheet P transported below the frame 70.

The print sheet P having exited the head chamber 74 passes through a gap between two transport rollers 82C, passes through the inside of a drier 78, passes through a gap between two guide rollers 82D, and is taken up by the take-up roller 80B. The transport speed of the print sheet P is, for example, 100 m/min. Each roller may be controlled by the controller 88 or may be manually operated by a person.

As the drier 78 dries the print sheet P, it is possible to reduce sticking of print sheets P that are wound by the take-up roller 80B in an overlapping manner and to reduce smearing of the print sheet P with wet liquid. It is necessary to dry the print sheet P rapidly in order to perform printing at a high speed. In order to speed up drying, the drier 78 may perform drying by sequentially using a plurality of drying methods, or may perform drying by simultaneously using a plurality of drying methods. Examples of drying methods that can be used in such a case include blowing of warm air, irradiation with infrared radiation, and contact with a heated roller. When irradiating with infrared radiation, infrared radiation in a specific frequency may be used in order to speed up drying while reducing damage to the print sheet P. When bringing the print sheet P into contact with a heated roller, the heat transfer time may be increased by transporting the print sheet P along the cylindrical surface of the roller. The range in which the print sheet P is transported along the cylindrical surface of the roller is preferably ¼ or more of the cylindrical surface of the roller and more preferably ½ or more of the cylindrical surface of the roller. When performing printing with a UV curable ink or the like, a UV irradiation light source may be disposed, instead of the drier 78 or in addition to the drier 78. The UV irradiation light source may be disposed between the frames 70.

The printer 1 may include a cleaning unit that cleans the heads 2. The cleaning unit performs cleaning by, for example, wiping or capping. Wiping is performed, for example, by rubbing a surface of a portion where liquid is ejected, such as an ejection hole surface 4-2 (described below), with a flexible wiper, thereby removing liquid that has adhered to the surface. Cleaning by capping is performed, for example, as follows. First, by placing a cap to cover (referred to as "capping") a liquid ejection portion such as the ejection hole surface 4-2, a substantially hermetically closed space is formed by the ejection hole surface 4-2 and the cap. By repeatedly ejecting liquid in such a state, liquid having higher viscosity than in a normal state, foreign substances, and the like that have been blocking an ejection hole 8 (described below) are removed. By performing capping, it is possible to reduce spattering of liquid on the printer 1 during cleaning and to reduce adhesion of liquid to the print sheet P or a transport mechanism such as a roller. Wiping may be further performed on the ejection hole surface 4-2 that has been cleaned. Wiping and cleaning by capping may be performed by a person by manually operating a wiper or a cap attached to the printer 1 or may be automatically performed by the controller 88.

Instead of the print sheet P, the recording medium may be a rolled cloth or the like. Instead of directly transporting the print sheet P, the printer 1 may directly transport a transport belt and transport a recording medium placed on the transport belt. By doing so, it is possible to use a cut sheet, a cut cloth, a wood, a tile, or the like as a recording medium. Moreover, a wiring pattern of an electronic device may be printed by ejecting a liquid including electroconductive particles from the heads 2. Furthermore, a chemical medicine may be produced by, for example, ejecting a predetermined amount of liquid chemical agent or liquid including a chemical agent from the heads 2 toward a reactor vessel or the like to cause a reaction.

A position sensor, a speed sensor, a temperature sensor, and the like may be attached to the printer 1; and the controller 88 may control each portion of the printer 1 in accordance with the state of each portion that can be monitored from information from each sensor. For example, when the temperature of the heads 2, the temperature of liquid in a liquid supply tank 2 that supplies the liquid to the heads 2, the pressure that the liquid in the liquid supply tank applies to the heads 2, or the like exerts an effect on the ejection characteristics of ejected liquid, that is, the ejection amount and the ejection speed, a drive signal that causes the liquid to be ejected may be changed in accordance with such information items.

[Overview of Liquid Ejection Head]

Figure 2:
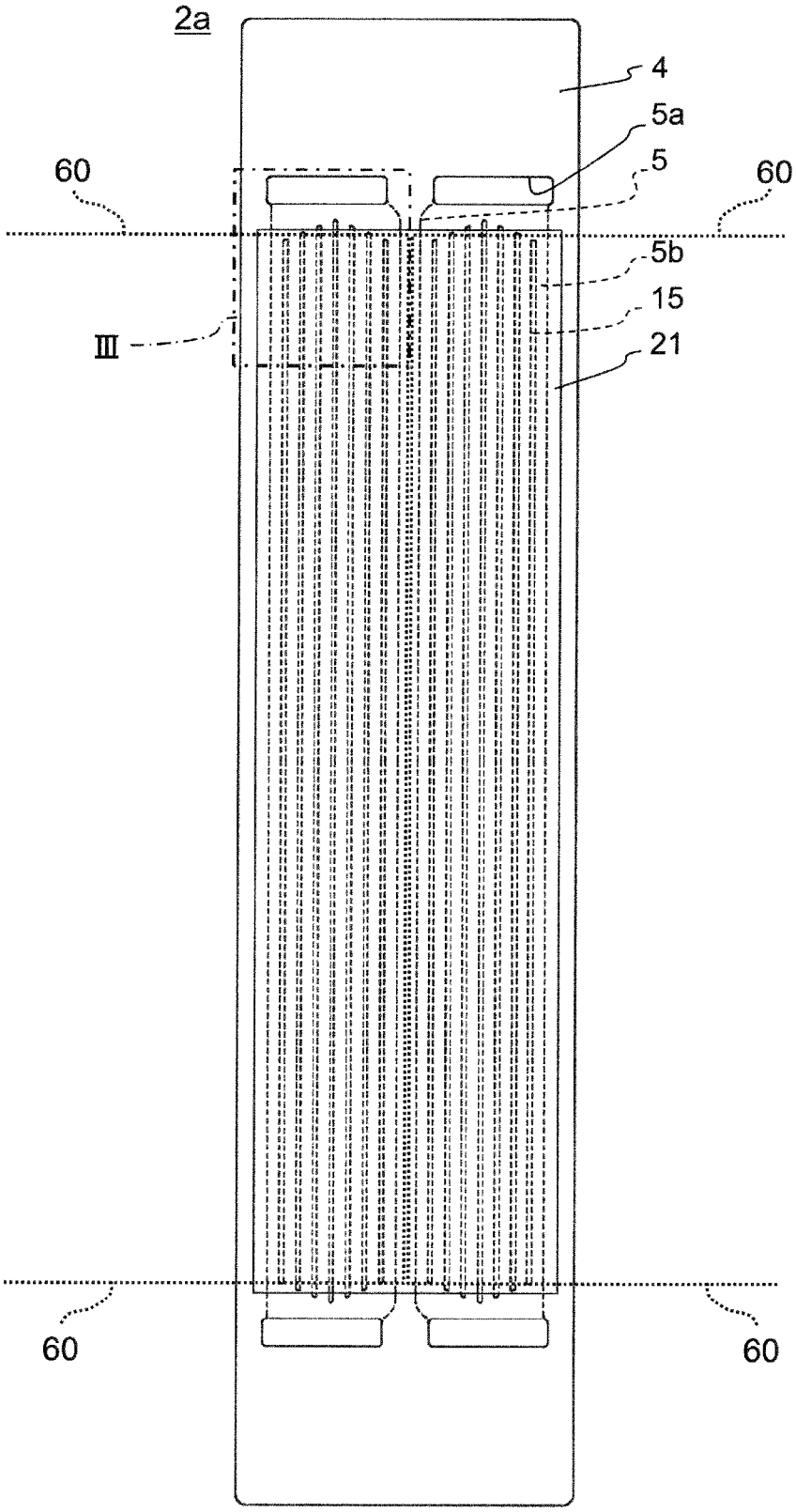
FIG. 2 is a plan view of a head body that is a main part of each liquid ejection head of FIG. 1.
Figure 3:
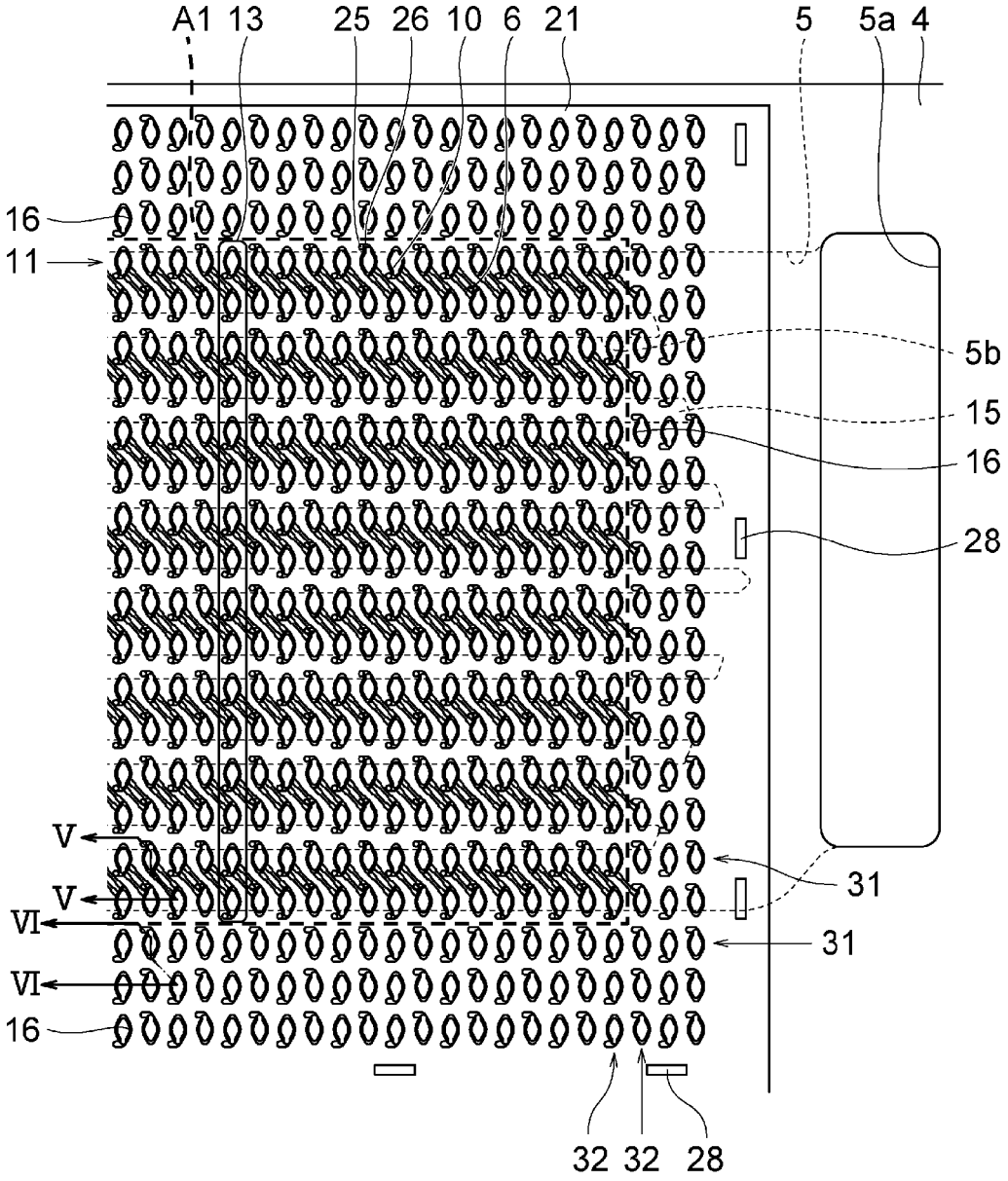
FIG. 3 is an enlarged plan view of a region III of FIG. 2 from which some channels are omitted.
Figure 4:
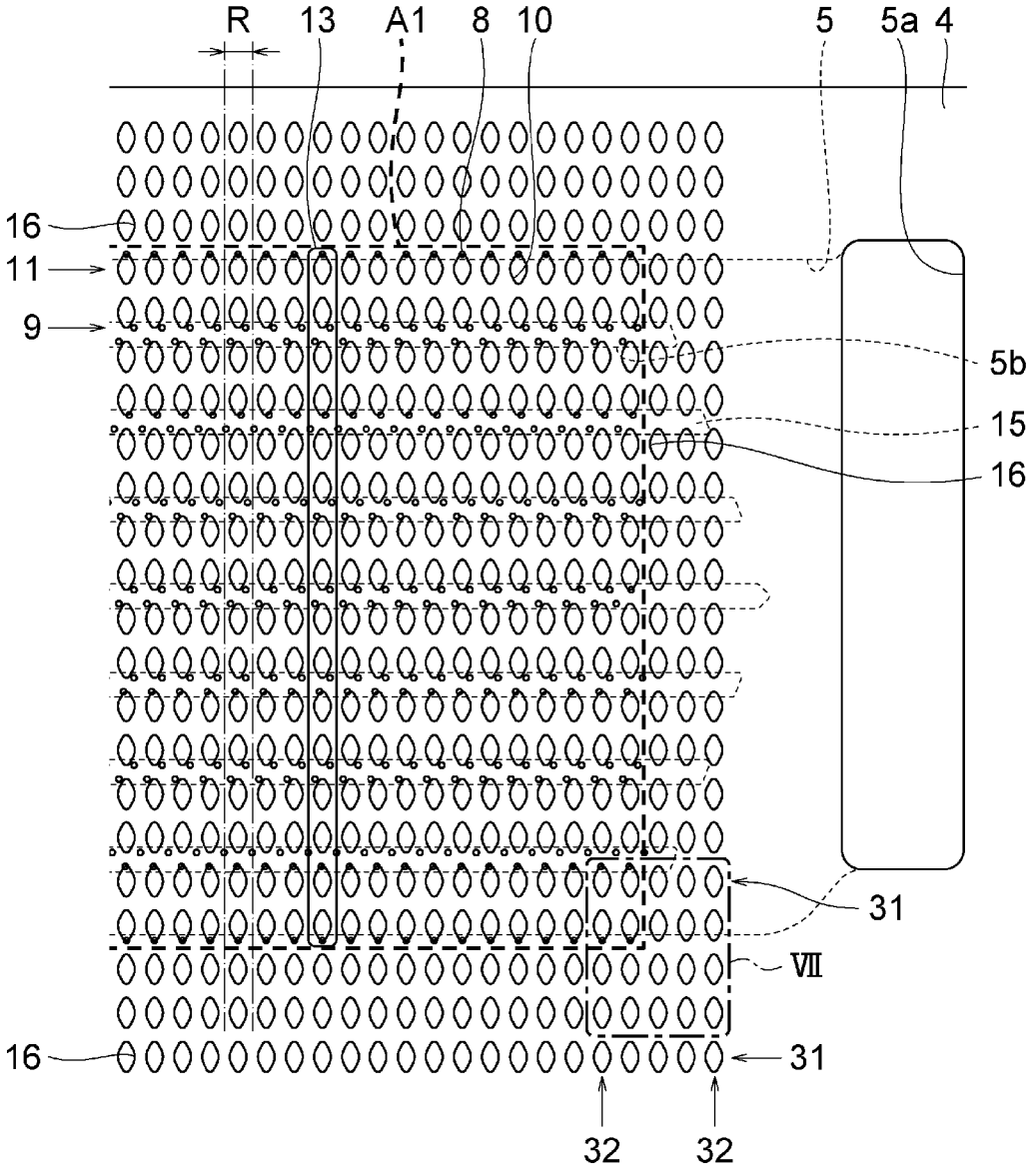
FIG. 4 is an enlarged plan view of the same position as FIG. 3 from which some other channels are omitted.
Figure 5:
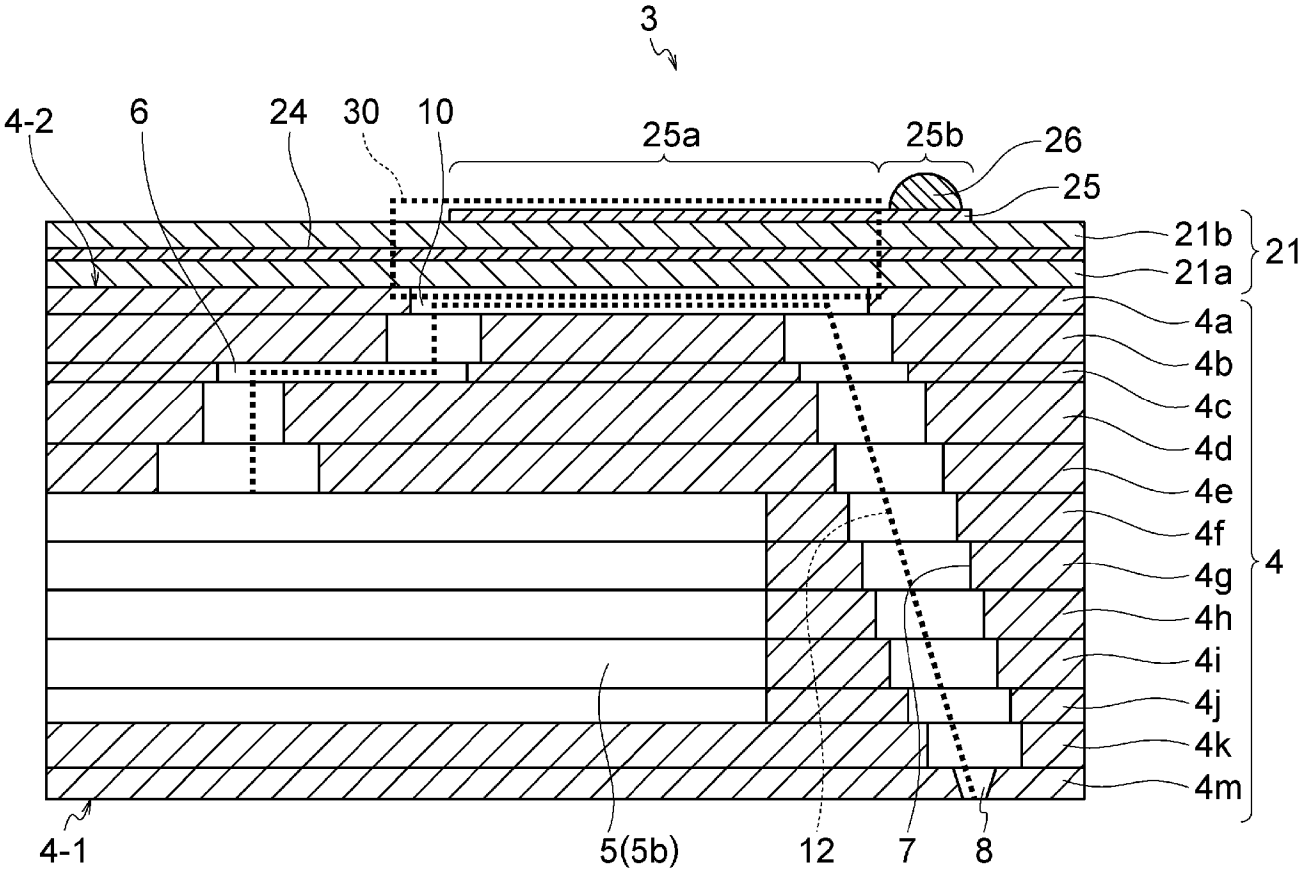
FIG. 5 is a longitudinal sectional view taken along line V-V of FIG. 3.

Next, the head 2 will be described. FIG. 2 is a plan view of a head body 2a that is a main part of each head 2 shown in FIG. 1. FIG. 3 is an enlarged plan view of a region III of FIG. 2. In FIG. 3, some channels are omitted for convenience of description. FIG. 4 is an enlarged plan view of the same position as FIG. 3 from which some channels other than those omitted from FIG. 3 are omitted. FIG. 5 is a longitudinal sectional view taken along line V-V of FIG. 3. In FIGS. 3 and 4, for ease of understanding the figures, channels and the like (such as pressurization chambers 10, throttles 6, and ejection holes 8 described below) that are positioned further on the back side of the sheet of the figure than members on the front side of the sheet of the figure (such as an actuator substrate 21 described below) and that are to be shown by broken lines are shown by solid lines.

The direction toward the back side of the sheet of FIGS. 2 to 4 and the downward direction along the sheet of FIG. 5 correspond to the direction from the head body 2a toward the print sheet P. In the following description, the direction from the head body 2a toward the print sheet P is defined as the downward direction, and terms such as an upper surface or a lower surface may be used for the head body 2a.

The head body 2a includes a channel member 4 and an actuator substrate 21 in which a plurality of pressurization portions 30 is formed. The liquid ejection head 2 may include, in addition to the head body 2a, a reservoir that supplies liquid to the head body 2a, and a housing.

The channel member 4 and the actuator substrate 21 are each a substantially flat-plate-shaped member whose thickness direction is a direction facing the print sheet P. The planar shape of the channel member 4 and the actuator substrate 21 is a rectangle whose longitudinal direction is a direction that is perpendicular to the direction in which the head body 2a and the print sheet P move relative to each other. The lower surface of the channel member 4 is an ejection hole surface 4-1 that faces the print sheet P. The upper surface of the channel member 4 is a pressurization chamber surface 4-2 to which the actuator substrate 21 is joined.

The channel member 4 includes a manifold 5 that is a common channel, a plurality of pressurization chambers 10 connected to the manifold 5, and a plurality of ejection holes 8 respectively connected to the plurality of pressurization chambers 10. An opening 5a, which is an end portion of the manifold 5, opens in the pressurization chamber surface 4-2. The pressurization chambers 10 open in the pressurization chamber surface 4-2, and are closed by the actuator substrate 21. The plurality of ejection holes 8 opens in the ejection hole surface 4-1. Each pressurization portion 30 is positioned on the pressurization chamber 10.

Liquid is supplied from the opening 5a to the manifold 5 and flows into the pressurization chamber 10. Then, the pressurization portion 30 applies pressure to the pressurization chamber 10, and thereby a liquid droplet is ejected from the ejection hole 8. By individually controlling a plurality of pressurization portions 30, liquid droplets can be ejected from any ejection holes 8.

The channel from the manifold 5 to the ejection hole 8 (excluding the manifold 5 and including the ejection hole 8) may be referred to as an individual channel 12. The combination of the individual channel 12 and the pressurization portion 30 may be referred to as an ejection element 3. The position of the ejection element 3 and the position of a dummy ejection element (described below) in plan view may be described with reference to the position of the pressurization chamber 10.

To the actuator substrate 21, a signal transmitter 60 that supplies a signal to each pressurization portion 30 is connected. In FIG. 2, in order to illustrate a state in which two signal transmitters 60 are connected to the actuator substrate 21, the outlines of portions of the signal transmitters 60 that are connected to the actuator substrate 21 are shown by dotted lines. The two signal transmitters 60 are connected to the actuator substrate 21 in such a way that ends thereof are positioned at a central part of the actuator substrate 21 in the transversal direction.

Hereafter, first, basic components of the channel member and the actuator substrate 21 that are directly related to ejection of liquid will be described. Next, a dummy ejection element, which is not directly related to ejection of the liquid, will be described. The dummy ejection element contributes to, for example, reduction of nonuniform density due to mutual interference between the pressurization portions 30 (structural crosstalk).

[Channel Member]

(Manifold) Two manifolds 5 are formed in the channel member 4. Each manifold 5 has an elongated shape that extends from one end portion to the other end portion of the channel member 4 in the longitudinal direction; and the opening 5a of the manifold 5, which opens in the upper surface of the channel member 4, is formed at each of the two end portions of the manifold 5.

At least in a central part in the longitudinal direction, the manifold 5 is divided by partition walls 15 that are disposed with a spacing therebetween in the transversal direction. The partition walls 15 each have the same height as the manifold 5 and completely divide the manifold 5 into a plurality of sub-manifolds 5b. The sub-manifolds 5b are connected to the pressurization chambers 10. At positions that overlap the partition walls 15 in plan view, descenders 7 that extend from the pressurization chambers 10 to the ejection holes 8, and the ejection holes 8 are disposed.

Two manifolds 5 are disposed independently, and the openings 5a are disposed at both end portions of each of the manifolds 5. One manifold 5 includes seven partition walls 15 and eight sub-manifolds 5b. The width of each sub-manifold 5b is larger than the width of each partition wall 15, and thereby it is possible to allow a large amount of liquid to flow through the sub-manifold 5b.

(Pressurization Chamber)

A plurality of pressurization chambers 10 is distributed two-dimensionally in plan view. Each pressurization chamber 10 is a thin hollow region having a constant thickness. The planar shape of the pressurization chamber 10 is a substantially rhombic shape with rounded corners (example shown in the figures), an ellipse, or a circle. One end of the pressurization chamber 10 in the planar direction is connected to one sub-manifold 5b via a throttle 6. The other end of each pressurization chamber 10 is connected to the ejection hole 8 via the descender 7.

Along one sub-manifold 5b, a pressurization chamber column 11, which is a column of the pressurization chambers 10 that are connected to this sub-manifold 5b, is disposed on each of two sides of the sub-manifold 5b, and thus two pressurization chamber columns 11 are disposed. Accordingly, for one manifold 5, sixteen pressurization chamber columns 11 are disposed, and thirty-two pressurization chamber columns 11 are disposed in the entirety of the head body 2a. The pitch of pressurization chamber columns 11 connected to one manifold 5 is constant. The pitch of the pressurization chambers 10 in each pressurization chamber column 11 is constant, and the pitch is the same for a plurality of pressurization chamber columns 11.

The pressurization chambers 10 connected to one manifold 5 are disposed in a matrix pattern having columns and rows along outer edges of the actuator substrate 21 having a rectangular shape. In other words, the positions of the pressurization chambers 10 are the same as each other for the pressurization chamber columns 11 that are adjacent to each other, and the plurality of pressurization chambers 10 constitutes pressurization chamber rows 13 that are perpendicular to the sub-manifold 5b. The pressurization chamber rows 13 may intersect the sub-manifold 5b at an angle.

The plurality of pressurization chambers 10 connected to one manifold 5 constitutes a pressurization chamber group. Because there are two manifolds 5, there are two pressurization chamber groups. The dispositions of the pressurization chambers in a pressurization chamber group are the same for the two pressurization chamber groups, and the positions of the pressurization chambers 10 coincide when the two pressurization chamber groups are moved parallelly in the transversal direction of the head body 2a.

(Ejection Hole)

The ejection holes 8 connected to the pressurization chambers 10 included in one pressurization chamber column 11 constitute one ejection hole column 9. Since two pressurization chamber columns 11 are connected to one sub-manifold 5b, two ejection hole columns 9 are connected to one sub-manifold 5b. The two ejection hole columns 9 connected to one sub-manifold 5b are positioned on the sides opposite to each other with respect to the sub-manifold 5b. In FIG. 4, two ejection hole columns 9 are disposed for the partition wall 15, and the ejection holes 8 included in respective ejection hole columns 9 are connected to the sub-manifold 5b adjacent to the ejection holes 8.

The positions of the ejection holes 8 of a plurality of ejection hole columns 9 do not overlap as seen in the direction in which the head body 2a and the print sheet P move relative to each other. For example, as illustrated in FIG. 4, an imaginary straight line (range R) that is perpendicular to the direction in which the head body 2a and the print sheet P move relative to each other is assumed, and the ejection holes 8 of the plurality of ejection hole columns 9 are projected onto the imaginary straight line. Within the range R on the imaginary straight line, thirty-two ejection holes 8 connected to thirty-two sub-manifolds 5b can be disposed at a regular spacing. With such disposition of the ejection holes 8, it is possible to form, on the print sheet P, dots that are arranged in the direction of the imaginary straight line at a pitch that is equal to the quotient of the pitch of the ejection holes 8 in each ejection hole column 9 divided by the number of ejection hole columns 9.

Thus, for example, when the ejection holes 8 are arranged at 37.5 dpi in each ejection hole column 9, by supplying the same color ink to all manifolds 5, it is possible to form an image with a resolution of 1200 dpi as a whole in the longitudinal direction. One ejection hole 8 connected to one manifold 5 has a regular spacing of 600 dpi in the range R of the imaginary straight line. Thus, by supplying different colors of ink to the manifolds 5, it is possible to form a two-color image with a resolution of 600 dpi as a whole in the longitudinal direction. In this case, it is possible to form a four-color image with a resolution of 600 dpi by using two liquid ejection heads 2, and the printing precision is higher and print setting can be performed more easily than by using four liquid ejection heads that can perform printing at 600 dpi.

As described above, whereas the positions of the ejection holes 8 in the direction of the imaginary straight line differ between the ejection hole columns 9, the positions of the pressurization chambers 10 in the direction of the imaginary straight line are the same as each other for pressurization chamber columns 11. Accordingly, the relative positions of the pressurization chambers 10 and the ejection holes 8 that are connected to each other differ between the pressurization chamber columns 11 and, for example, are the same in each pressurization chamber column 11. Such a difference in relative position is realized by making the shapes of the descenders 7, which connect the pressurization chambers 10 and the ejection holes 8, differ between the pressurization chamber columns 11.

(Stack Structure of Channel Member)

The channel member 4 has a stack structure in which a plurality of plates is stacked via adhesive layers (not shown). These plates are stacked in order of a plate 4a, a plate 4b, a plate 4c, a plate 4d, a plate 4e, a plate 4f, a plate 4g, a plate 4h, a plate 4i, a plate 4j, a plate 4k, and a plate 4m, from the upper surface of the channel member 4. The thickness of each plate is about 10 to 300 μm. The thickness of the channel member 4 is about 500 μm to 2 mm.

Multiple holes are formed in these plates. These holes communicate with each other and constitute the individual channel 12 and the manifold 5. The pressurization chamber 10 is positioned on the upper side of the channel member 4 (for example, the upper side relative to the center of the channel member 4 in the thickness direction). The sub-manifold 5b is positioned on the lower side relative to the pressurization chamber 10. The throttle 6 connects the upper surface of the sub-manifold 5b and the lower surface of the pressurization chamber 10. The descender 7 extends downward from the lower surface of the pressurization chamber 10 to the ejection hole 8.

Holes or grooves that serve as channels in the plates include the following. A first one is a hole that serves as the pressurization chamber 10, and this hole is formed in the plate 4a. A second one is a hole that serves as the throttle 6, and this hole is formed in each of the plates 4b to 4e. A third one is a hole that serves as the descender 7, and this hole is formed in each of the plates 4b to 4k. A fourth one is a hole that serves as the ejection hole 8, and this hole is formed in the plate 4m. A fifth one is a hole that constitutes the manifold 5, and this hole is formed in the plates 4a to 4j. In the plates 4f to 4j, a hole that constitutes the sub-manifold 5b is formed in such a way that a partition that serves as the partition wall 15 remains. The partition in the plates 4f to 4j is connected to the plates 4f to 4j via a half-etched support portion (which is omitted in the figures).

[Actuator Substrate]

The actuator substrate 21 has a stack structure composed of two piezoelectric ceramic layers 21a and 21b, which are piezoelectric bodies. The actuator substrate 21 includes a common electrode 24 that is positioned between the piezoelectric ceramic layers 21a and 21b, and an individual electrode 25 that is positioned on the upper surface of the piezoelectric ceramic layer 21b.

The piezoelectric ceramic layers 21a and 21b each have a thickness of about 20 μm. The thickness from the lower surface of the piezoelectric ceramic layer 21a to the upper surface of the piezoelectric ceramic layer 21b is about 40 μm. Each of the piezoelectric ceramic layers 21a and 21b extends over a plurality of pressurization chambers 10. The piezoelectric ceramic layers 21a and 21b are each made of, for example, a ferroelectric ceramic material, such as lead zirconate titanate (PZT), $NaNbO_3$, $BaTiO_3$, $(BiNa)NbO_3$, $BiNaNb_5O_{15}$, or the like. The piezoelectric ceramic layer 21a, which functions as a vibration plate, need not be a piezoelectric body; and instead, a non-piezoelectric ceramic layer or a metal plate may be used.

The common electrode 24 is made of a metal material such as a Ag—Pd-based material. The individual electrode 25 is made of a metal material such as a Au-based material. The thickness of the common electrode 24 is about 2 μm, and the thickness of the individual electrode 25 is about 1 μm.

A plurality of individual electrodes 25 individually faces a plurality of pressurization chambers 10. Each individual electrode 25 includes an individual electrode body 25a having a planar shape that is slightly smaller than and similar to the planar shape of the pressurization chamber 10, and an extension electrode 25b extending from the individual electrode body 25a. A connection electrode 26 is disposed on an end portion of the extension electrode 25b extending to the outside of a region facing the pressurization chamber 10. The connection electrode 26 is made of, for example, an electroconductive resin including electrically conductive particles such as silver particles, and has a thickness of about 5 to 200 μm. The connection electrode is joined to an electrode (not shown) of the signal transmitter 60.

The common electrode 24 is formed on substantially the entirety of a surface of each of the piezoelectric ceramic layers 21b and 21a. That is, the common electrode 24 extends in such a way as to cover all of the pressurization chambers 10. The common electrode 24 is connected to a common-electrode surface electrode 28 (FIG. 3), which is formed on the piezoelectric ceramic layer 21b at a position that does not overlap electrode groups each composed of the individual electrodes 25, via a via conductor (not shown) that extends through the piezoelectric ceramic layer 21b. The common electrode 24 is grounded via the common-electrode surface electrode 28 and is maintained at a ground potential. The common-electrode surface electrode 28 is joined to an electrode (not shown) of the signal transmitter 60.

A portion of the piezoelectric ceramic layer 21b interposed between the individual electrode 25 and the common electrode 24 is polarized in the thickness direction. The actuator substrate 21 deforms when the individual electrode 25 is made to have a potential different from that of the common electrode 24 and an electric field is applied to the piezoelectric ceramic layer 21b in the polarization direction. To be specific, when an electric field is applied in a direction the same as the polarization direction, the portion of the piezoelectric ceramic layer 21b interposed between the electrodes (active portion) contracts in the in-plane direction. On the other hand, the piezoelectric ceramic layer 21a, which is an inactive layer that is not affected by the electric field, does not voluntarily contract and attempts to restrict deformation of the active portion. As a result, difference in strain in the polarization direction occurs between the piezoelectric ceramic layer 21a and the piezoelectric ceramic layer 21b, and the piezoelectric ceramic layer 21a deforms to become convex toward the pressurization chamber 10 side (unimorph deformation). Conversely, when an electric field is applied in a direction opposite to the polarization direction, the piezoelectric ceramic layer 21a deforms to become concave toward the pressurization chamber 10 side.

Portions of the piezoelectric ceramic layers 21a and 21b and the common electrode 24 that substantially overlap one pressurization chamber 10 and one individual electrode 25 constitute one pressurization portion 30. The pressurization portion 30 is disposed for each pressurization chamber 10. Unless otherwise noted, the relationship between the sizes and positions of the plurality of pressurization chambers 10 is reflected on the relationship between the sizes and positions of the plurality of pressurization portions 30. Although the extension electrode 25b of the individual electrode 25, which is a part of the pressurization portion 30, extends to the outside of the pressurization chamber 10, it may be hypothetically assumed that the pressurization portion 30 has the same planar shape as the pressurization chamber 10 and is disposed at the same position as the pressurization chamber 10. Accordingly, in the above description and the following description regarding the shape and size of the pressurization chamber 10 in plan view, the pressurization chamber 10 may be read as the pressurization portion 30. The same applies to a dummy pressurization chamber 16 and a dummy pressurization portion 36 described below.

The signal transmitter 60 is constituted by a flexible printed circuit (FPC) and is disposed to face the upper surface of the actuator substrate 21. Although not particularly illustrated in the figures, the signal transmitter 60 includes a plurality of electrodes facing and joined to a plurality of connection electrodes 26 and a plurality of common-electrode surface electrodes 28, and a plurality of wires interconnecting the plurality of electrodes to the controller 88. Because two signal transmitters 60 are disposed for one head body 2a, wiring density is reduced in half compared with a configuration in which one signal transmitter 60 is disposed for one head body 2a (this configuration is also included in the technology according to the present disclosure).

[Ejection Operation]

The pressurization portion 30 is driven (displaced) by a drive signal that is supplied to the individual electrode 25 via a driver IC or the like under the control by the controller 88. The drive signal is supplied at regular intervals in synchronism with the transport speed of the print sheet P. Although it is possible to eject a liquid by using various drive signals with the present embodiment, a so-called pull driving method will be described here.

The individual electrode 25 is made beforehand to have a higher potential than the common electrode 24 (hereafter, referred to as "high potential"), the potential of the individual electrode 25 is temporarily changed to the same potential as the common electrode 24 (hereafter, referred to as "low potential") every time an ejection request is made, and subsequently the potential of the individual electrode 25 is returned to a high potential at a predetermined timing. Thus, at a timing when the potential of the individual electrode 25 becomes a low potential, the shapes of the piezoelectric ceramic layers 21a and 21b (begin to) return to the original (flat) shapes, and the volume of the pressurization chamber 10 increases compared with an initial state (state in which the potentials of both electrodes differ). Thus, a negative pressure is applied to liquid in the pressurization chamber 10. Then, the liquid in the pressurization chamber 10 starts to vibrate with a natural vibration period. To be specific, first, the volume of the pressurization chamber 10 starts to increase and the negative pressure gradually decreases. Next, the volume of the pressurization chamber 10 becomes maximum, and the pressure becomes substantially zero. Next, the volume of the pressurization chamber 10 starts to decrease, and the pressure increases. Subsequently, at a timing when the pressure becomes substantially maximum, the potential of the individual electrode 25 is changed to a high potential. Then, vibration applied first and vibration applied next are superposed, and a higher pressure is applied to the liquid. The pressure is transmitted through the inside of the descender 7, thereby ejecting liquid from the ejection hole 8.

That is, it is possible to eject a liquid droplet by supplying to the individual electrode 25 a pulse drive signal that has a low potential for a certain period with reference to a high potential. When the pulse width corresponds to a time that is half the natural vibration period of the pressurization chamber 10, that is, an acoustic length (AL), in principle, the ejection speed and the ejection amount of liquid become maximum. The natural vibration period of liquid in the pressurization chamber 10 is greatly affected by the properties of liquid and the shape of the pressurization chamber 10, and in addition, receives effects from the properties of the actuator substrate and the characteristics of channels connected to the pressurization chamber 10.

The pulse width is set to a value in the range of about 0.5 AL to 1.5 AL, because there are other factors, such as joining ejected liquid droplets into one droplet, to be considered. The pulse width is set to a value deviated from AL, because it is possible to reduce the ejection amount by setting the pulse width to a value deviated from AL.

[Dummy Ejection Element]

Figure 6:
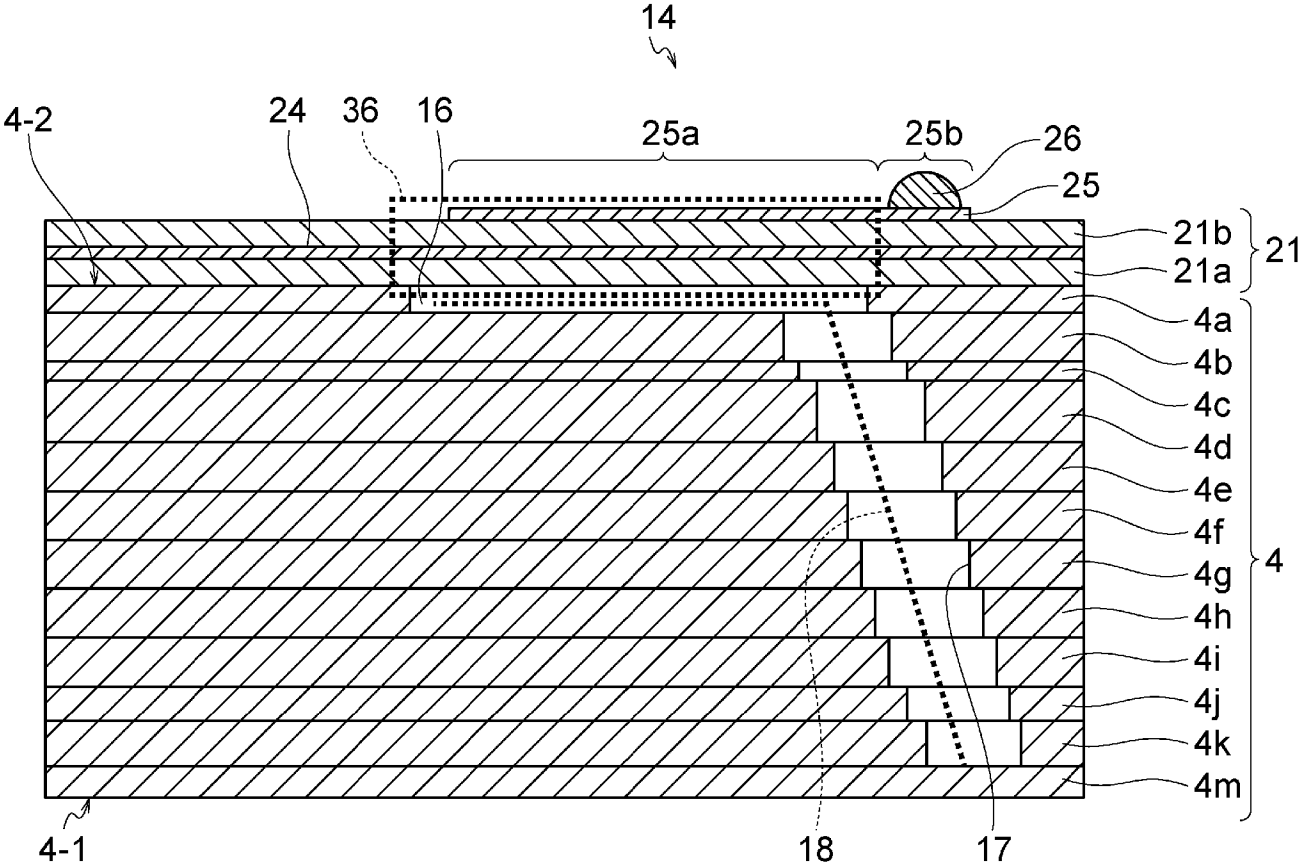
FIG. 6 is a longitudinal sectional view taken along line VI-VI of FIG. 3.

FIG. 6 is a sectional view taken along line VI-VI of FIG. 3. As can be clearly seen by comparing FIG. 6 with FIG. 5, which is a sectional view taken along line V-V of FIG. 3, the head body 2a includes a dummy ejection element 14 similar to the ejection element 3. Dummy ejection elements 14 are arranged in succession to the arrangement of the ejection elements 3 as if the arrangement of the ejection elements 3 is extended outward. However, the dummy ejection elements 14 differ from the ejection elements 3 in that the dummy ejection elements 14 do not eject liquid droplets.

To be specific, each dummy ejection element 14 includes a dummy individual channel 18 in the channel member 4 and a dummy pressurization portion 36 in the actuator substrate 21. The dummy individual channel 18 includes, for example, a dummy pressurization chamber 16 and a dummy descender 17. The dummy pressurization portion 36 is positioned on the dummy pressurization chamber 16. The dummy individual channel 18 differs from the individual channel 12 in that the dummy individual channel 18 is not connected to (is isolated from) the manifold 5. The dummy individual channel 18 differs from the individual channel 12 in that the dummy individual channel 18 does not include the ejection hole 8. Accordingly, even when the dummy pressurization portion 36 applies pressure to the dummy pressurization chamber 16, a liquid droplet is not ejected from the dummy ejection element 14.

By providing the dummy ejection elements 14, it is possible to make the ejection characteristics of all of the plurality of ejection elements 3 uniform. Specifics are, for example, as follows. As illustrated in FIG. 3, when a region in which a plurality of ejection elements 3 is disposed is defined as a region A1, an ejection element 3 positioned in a central part of the region A1 and ejection elements 3 therearound mechanically interfere with each other in pressurization portions 30. That is, structural crosstalk occurs. As a result, for example, the ejection performance of the ejection element 3 in the central part decreases compared with a case where other ejection elements 3 are not disposed therearound. On the other hand, regarding an ejection element 3 positioned at an end of the region A1, because no other ejection element 3 is positioned outside thereof, the ejection element 3 is less affected by structural crosstalk than the ejection element 3 in the central part, and by extension decrease of ejection performance is small. As a result, variation occurs in the ejection characteristics of the plurality of ejection element 3. The variation may emerge, for example, as banded shades in a printed image, and in particular, tends to emerge as a dark line that is at an end in a direction perpendicular to the transport direction of the print sheet P and that is dark compared with the central side. However, by providing the dummy ejection elements 14 outside of the region A1, it is possible to exert the effect of structural crosstalk also on the ejection element 3 positioned at the end in the same way as on the ejection element 3 in the central part. As a result, variation in the ejection characteristics of the plurality of ejection elements 3 is reduced.

Specific configurations of the dummy ejection element 14 may be the same as those of the ejection element 3 except that the dummy ejection element 14 does not eject a liquid droplet. Accordingly, for example, the above descriptions of the configurations, the shapes, the dimensions, and the like of the pressurization chamber 10, the descender 7, and the pressurization portion 30 may be read as the descriptions of the configurations, the shapes, the dimensions, and the like of the dummy pressurization chamber 16, the dummy descender 17, and the dummy pressurization portion 36. In other words, for example, the configurations, the shapes, the dimensions, and the like of the dummy pressurization chamber 16 and the dummy pressurization portion 36 may be the same as the configurations, the shapes, the dimensions, and the like of the pressurization chamber 10 and the pressurization portion 30. The dummy descender 17 need not extend toward the ejection hole 8, and the dummy descender 17 may extend in any appropriate direction, such as a direction that is the same as the direction in which the descender 7 connected to one of the plurality of pressurization chamber columns 11 extends.

In the example illustrated in FIG. 6, the dummy individual channel 18 has a configuration such that the entirety of the throttle 6 and the ejection hole 8 are omitted from the individual channel 12. However, the dummy individual channel 18 is not limited to this example. For example, the entirety of the dummy descender 17 or a part of the dummy descender 17 on the ejection hole surface 4-1 side may be omitted. For example, the dummy individual channel 18 may include a dummy throttle configured such that, from the throttle 6 of the individual channel 12, a part of the throttle 6 on the manifold 5 side is omitted.

As described above, the dummy ejection element 14 is disposed as if the ejection element 3 is disposed further outward. Accordingly, for example, the dummy pressurization chambers 16 are disposed for all pressurization chamber columns 11, and are arranged in succession to the arrangement of the pressurization chambers 10 in each pressurization chamber column 11. The number of dummy pressurization chambers 16 at each end of each pressurization chamber column 11 is one or more, and is three in the example shown in the figures. For example, the dummy pressurization chambers 16 are disposed for all pressurization chamber rows 13, and are arranged in succession to the arrangement of the pressurization chambers 10 in each pressurization chamber row 13. The number of dummy pressurization chambers 16 at each end of each pressurization chamber row 13 is one or more, and is three in the example shown in the figures.

From another viewpoint, a plurality of dummy pressurization chambers 16 constitutes a dummy pressurization chamber column 31 that is serial or parallel to a pressurization chamber column 11. A plurality of dummy pressurization chambers constitutes a dummy pressurization chamber row 32 that is serial or parallel to the pressurization chamber row 13. That is, the dummy pressurization chambers 16 are arranged in a matrix pattern. The dummy pressurization chambers 16 are also disposed outside of the corners of the matrix of the pressurization chambers 10 in such a way that the dummy pressurization chamber columns 31 and the dummy pressurization chamber rows 32 intersect while maintaining the number of columns and the number of rows thereof.

For example, the dummy ejection elements 14 are disposed along the entire periphery of the region A1 in which a plurality of ejection elements 3 connected to one manifold 5 is disposed. Although only one of the two manifolds 5 is shown in FIGS. 3 and 4, the same applies to the other manifold 5. Between two regions A1, for example, the dummy ejection elements 14 corresponding to one region A1 and the dummy ejection elements 14 corresponding to the other region A1 are disposed with a spacing therebetween that is larger than that between the pressurization chambers 10 in the pressurization chamber row 13. The spacing is used, for example, to dispose the common-electrode surface electrode 28 therein.

The individual electrode 25 of the dummy pressurization portion 36 is joined to the signal transmitter 60 via the connection electrode 26, as with the individual electrode 25 of the pressurization portion 30. As with the dummy pressurization portion 36, the pressurization portion 30 is driven when a drive signal is input from the controller 88 to the individual electrode 25 through the signal transmitter 60.

However, whereas a drive signal input to the pressurization portion 30 is controlled in accordance with the contents of print data (the contents of an image), the drive signal input to the dummy pressurization portion 36 need not be controlled in accordance with the contents of print data. The drive signal input to the dummy pressurization portion 36 may be controlled in any appropriate way.

For example, regarding each pressurization portion 30, a timing when a liquid droplet is to be ejected is selected from ejection timings that repeat at regular intervals, in accordance with the contents of print data, and a drive signal is input only at the timing. Regarding the dummy pressurization portion 36, for example, irrespective of the contents of print data, during the time when printing is performed (during the time when the ejection hole 8 faces a print area corresponding to the print data), a drive signal may be input at each of ejection timings that repeat at the regular intervals.

For example, the contents of print data may be additionally used to control a drive signal input to the dummy pressurization portion 36. To be specific, for example, among the ejection timings that repeat at regular intervals, only at a timing when a drive signal is input to at least one of the plurality of pressurization portions 30 (or at each of the timing and timings immediately before and after the timing), a drive signal may be input to the dummy pressurization portion 36. For example, among the ejection timings that repeat at regular intervals, only at a timing when a drive signal is input to the pressurization portion 30 that receives the effect of structural crosstalk from the dummy pressurization portion 36 (or at each of the timing and timings immediately before and after the timing), a drive signal may be input to only the dummy pressurization portion 36 that exerts the effect of structural crosstalk on the pressurization portion 30 or to all of the dummy pressurization portions 36.

The waveform of a drive signal input to the dummy pressurization portion 36 is the same as the waveform of a drive signal input to the pressurization portion 30. However, these waveforms may differ. The waveform of a drive signal input to the pressurization portion 30 may be controlled in accordance with the contents of print data. In this case, for example, the waveform of a drive signal input to the dummy pressurization portion 36 may be, among the waveforms of drive signals input to the pressurization portion 30, a waveform that is considered to be an average or a waveform when ejecting the maximum amount of liquid droplets.

[Closed Space]

Figure 7:
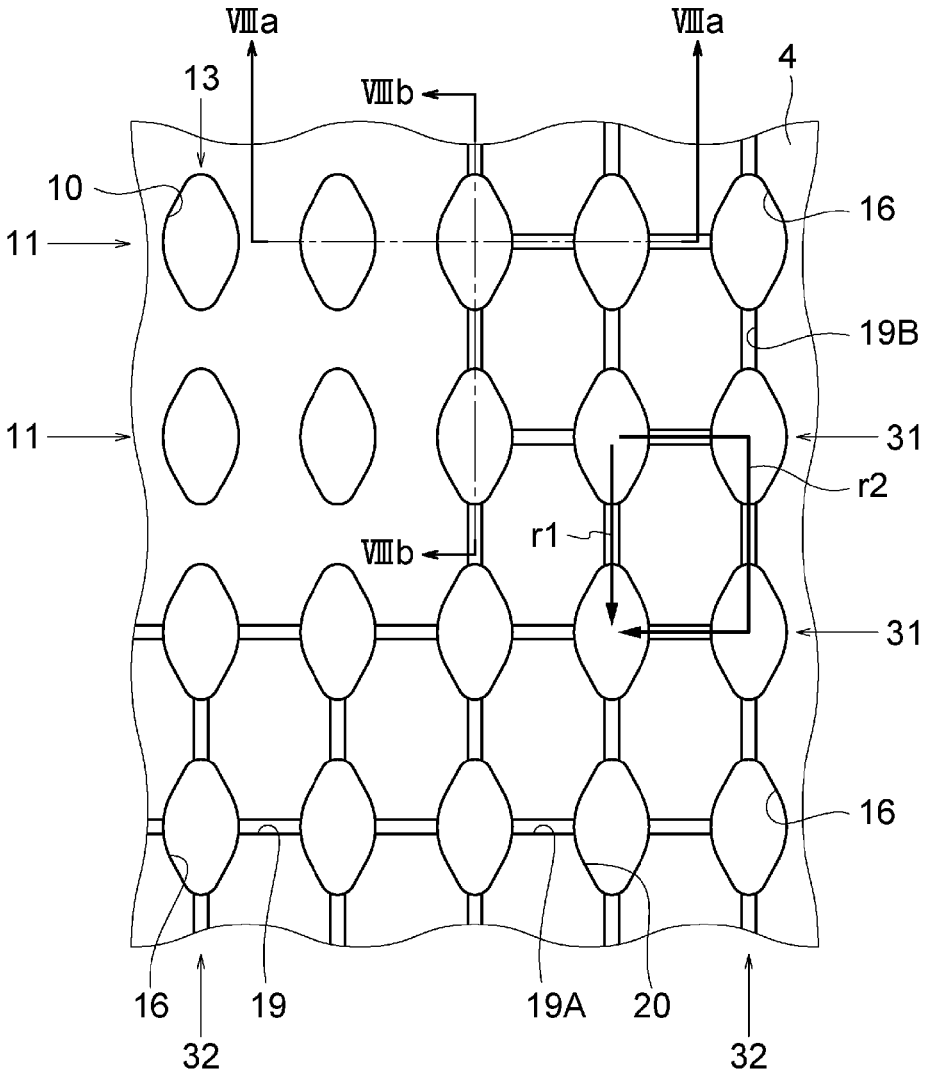
FIG. 7 is a plan view of some channels in a region corresponding to a region VII of FIG. 4.

FIG. 7 is a plan view of some channels of the channel member 4 in a region corresponding to a region VII of FIG. 4. Although the shapes and dispositions of the pressurization chambers 10 and the dummy pressurization chambers 16 are illustrated here, the same applies to the shapes and dispositions of the pressurization portions 30 and the dummy pressurization portions 36. The same applies to FIGS. 10 to 13 of the modifications described below.

A plurality of dummy pressurization chambers 16 is connected to each other via a plurality of communication paths (19A and 19B). Thus, a closed space 20, which has a volume larger than that of each dummy pressurization chamber 16, is formed. To be more specific, for example, all dummy pressurization chambers 16 around one region A1 are connected to each other. Accordingly, one closed space 20 having a frame-like and mesh-like shape is formed in such a way as to surround one region A1. In the present embodiment, the closed space 20 is disposed for each of two regions A1. The two closed spaces 20 may be isolated from each other, or may be connected to each other to constitute one large closed space having a larger volume.

The closed space 20 is hermetically closed. In other words, the closed space 20 is isolated from a channel that is constituted by the manifold 5 and the individual channel 12 and through which liquid flows, and does not open to the atmosphere. For example, a gas is hermetically contained in the closed space 20. The gas is, for example, air. The pressure of the gas may be equal to the atmospheric pressure, lower than the atmospheric pressure, or higher than the atmospheric pressure.

If the plurality of dummy pressurization chambers 16 is not connected to each other, each of the dummy pressurization chambers 16 is a comparatively small hermetically closed space. As a result, for example, change in pressure in the dummy pressurization chamber 16 with respect to displacement of the dummy pressurization portion 36 is relatively large, and displacement of the dummy pressurization portion 36 may decrease. However, by forming the closed space 20 including a plurality of dummy pressurization chambers 16 and a plurality of communication paths 19, it is possible to make the size of the hermetically closed space relatively large and to eliminate the aforementioned drawback. In particular, the advantageous effect is improved with a configuration such that only some of the plurality of dummy pressurization portions 36 are driven as necessary.

The plurality of communication paths 19 includes, for example, a communication path 19A that connects the dummy pressurization chambers 16 in each dummy pressurization chamber column 31 to each other, and a communication path 19B that connects the dummy pressurization chambers 16 in each dummy pressurization chamber row 32 to each other. The communication path 19A linearly connects, for example, positions in the dummy pressurization chambers 16 that are adjacent to each other in each dummy pressurization chamber column 31, the positions being closest to each other. That is, the communication path 19A connects the dummy pressurization chambers 16 to each other in the shortest distance. Likewise, the communication path 19B connects, for example, positions in the dummy pressurization chambers 16 that are adjacent to each other in each dummy pressurization chamber row 32, the positions being closest to each other, with a straight line. That is, the communication path 19B connects the dummy pressurization chambers 16 to each other in the shortest distance.

Because the pluralities of communication paths 19A and 19B are disposed, any two dummy pressurization chambers 16 are connected to each other via two or more routes that are parallel to each other (two routes one of which bypasses the other). For example, a first route r1 indicated by an arrow includes one communication path 19B and connects two dummy pressurization chambers 16 that are adjacent to each other. A second route r2 indicated by an arrow sequentially includes one communication path 19A, one dummy pressurization chamber 16, one communication path 19B, one dummy pressurization chamber 16, and one communication path 19A; and connects the two dummy pressurization chambers 16 that are adjacent to each other.

There exists another route that connects the two dummy pressurization chambers 16 that are adjacent to each other and that does not overlap the first route r1 and the second route r2. Although the two dummy pressurization chambers 16 that are adjacent to each other in the dummy pressurization chamber row 32 have been described as an example, there exist two or more routes that are parallel to each other also between the dummy pressurization chambers 16 that are adjacent to each other in another direction (for example, adjacent to each other in the dummy pressurization chamber column 31) and between the dummy pressurization chambers 16 that are not adjacent to each other. Accordingly, when described as a superordinate concept, one of two parallel paths that connect various two dummy pressurization chambers 16 to each other includes at least one communication path 19 and the other of the two parallel paths includes at least one communication path 19 and at least one dummy pressurization chamber 16.

Figure 8A:
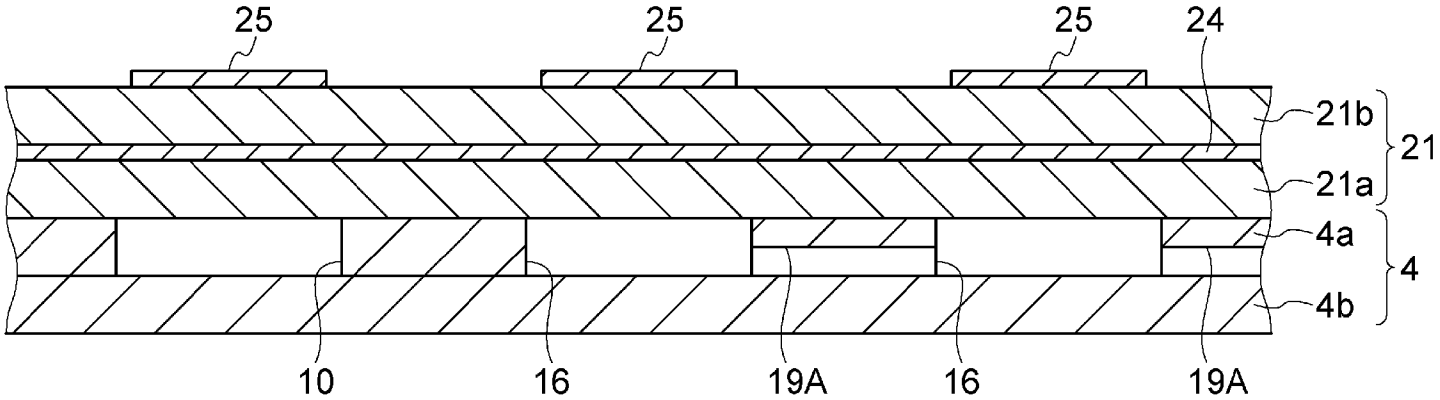
FIG. 8A and FIG. 8B are longitudinal sectional views taken along line VIIIa-VIIIa and line VIIIb-VIIIb of FIG. 7.
Figure 8B:
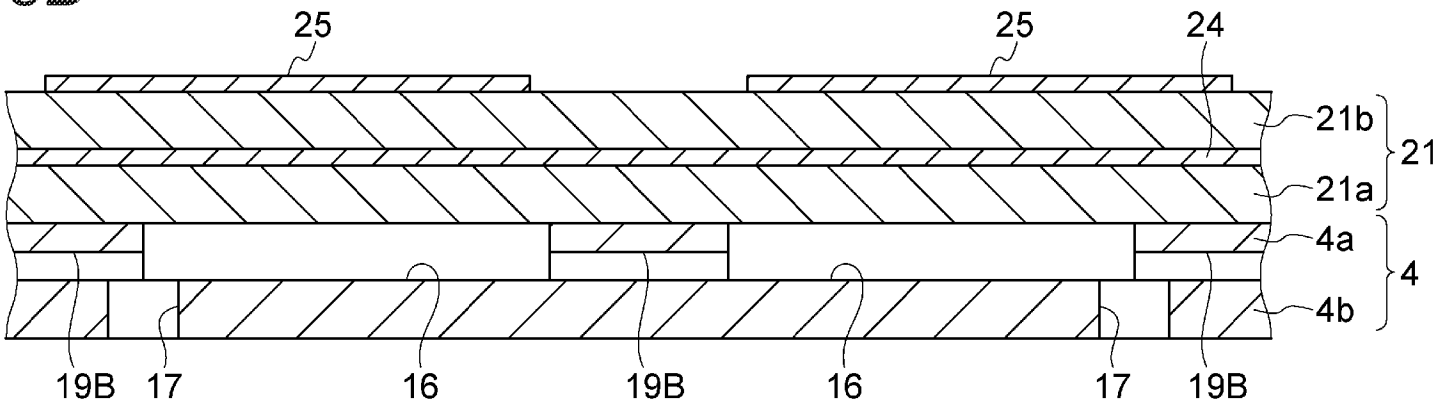

FIGS. 8(a) and 8(b) are sectional views of a part of the head body 2a on the upper side, FIG. 8A corresponds to VIIIa-VIIIa of FIG. 7, and FIG. 8B corresponds to VIIIb-VIIIb of FIG. 7.

The communication path 19 is constituted by, for example, a concave groove that is formed in a surface of the plate 4a opposite to the pressurization chamber surface 4-2. The concave groove is formed, for example, by half-etching the plate 4a. The concave groove may have any appropriate depth that is, for example, ⅓ or larger and ⅔ or smaller, or ½ of the thickness of the plate 4a (naturally, a tolerance may exist). As described above, the plate 4a forms at least a part, adjacent to the pressurization chamber surface 4-2, (in the present embodiment, all) of the pressurization chamber 10 and the dummy pressurization chamber 16.

As heretofore described, in the present embodiment, the head 2 includes the channel member 4 and the actuator substrate 21. The channel member 4 includes the ejection hole surface 4-1 and the pressurization chamber surface 4-2 on the opposite side. The actuator substrate 21 overlaps the pressurization chamber surface 4-2. The channel member 4 includes the plurality of ejection holes 8 opening in the ejection hole surface 4-1, the plurality of pressurization chambers 10 individually connected to the plurality of ejection holes 8 and arranged in the region A1 in plan view of the pressurization chamber surface 4-2, and the plurality of dummy pressurization chambers 16 positioned outside of the region A1 in plan view of the pressurization chamber surface 4-2. The actuator substrate 21 includes the plurality of pressurization portions 30 that individually pressurize the plurality of pressurization chambers 10, and the plurality of dummy pressurization portions 36 that individually pressurize the plurality of dummy pressurization chambers 16. The plurality of dummy pressurization chambers 16 are connected to each other via the plurality of communication paths 19. The closed space 20 including the plurality of dummy pressurization chambers 16 and the plurality of communication paths 19 is hermetically closed.

Accordingly, first, because the dummy pressurization chambers 16 and the dummy pressurization portions 36 are disposed, it is possible to reduce variation in ejection characteristics due to structural crosstalk as described above.

Here, the fact that the closed space 20 is hermetically closed means that, in other words, each of the plurality of dummy pressurization chambers 16 included in the closed space 20 differs from the pressurization chamber 10 in that the manifold side and the ejection hole 8 side thereof are closed (for example, the throttle 6 and the ejection hole 8 are not disposed). In order to prevent the dummy ejection element 14 from ejecting a liquid droplet, it is sufficient that only one of the manifold 5 side and the ejection hole 8 is closed. However, when only the manifold 5 side is closed, liquid (ink) flowed into the ejection hole 8 from the outside may solidify and close the ejection hole 8, and, as a result, the characteristics of the dummy ejection element 14 may change or the characteristics between the dummy ejection elements 14 may vary due to the change. In a case where only the ejection hole 8 side is closed, when the head 2 is started to be used and ink is made to flow from the opening 5a to the channel member 4 to remove air in the pressurization chamber 10 from the ejection hole 8, air remains in the dummy pressurization chamber 16. Due to variation and/or change in the amount of the air, variation and/or change in the characteristics of the dummy ejection elements 14 may occur. However, with the present embodiment, because both of the manifold 5 side and the ejection hole 8 side are closed, the probability of occurrence of the variation and/or change in the characteristics of the dummy ejection elements 14 is reduced.

When the dummy pressurization chamber 16 is hermetically closed as described above and if, in contrast to the present embodiment, the plurality of dummy pressurization chambers 16 is individually hermetically closed, displacement of the dummy pressurization portion 36 may be suppressed due to the pressure of the dummy pressurization chamber 16 as described above. However, with the present embodiment, because the plurality of dummy pressurization chambers 16 is connected to each other via the plurality of communication paths 19 to form the closed space 20, the probability of such suppression of displacement is reduced. While the plurality of dummy pressurization chambers 16 is connected to each other, the hermeticity of the closed space 20 is maintained. Accordingly, the probability that ink enters the closed space 20 is still reduced. By extension, the probability of the occurrence of variation and/or change in the characteristics of the dummy ejection elements 14 due to clogging of ink is reduced.

In the present embodiment, the channel member 4 includes the plurality of plates 4a to 4k and 4m that are stacked from the ejection hole surface 4-1 toward the pressurization chamber surface 4-2. The plurality of plates includes a cavity plate (plate 4a) that constitutes the pressurization chamber surface 4-2. The plate 4a includes an opening (hole) that is at least a part, adjacent the pressurization chamber surface 4-2, (in the present embodiment, all) of each of the plurality of pressurization chambers 10 and the plurality of dummy pressurization chambers 16. The actuator substrate 21 overlaps the pressurization chamber surface 4-2 and closes the plurality of pressurization chambers 10 and the plurality of dummy pressurization chambers 16. The plurality of communication paths 19 includes a communication path constituted by a concave groove that is positioned in a surface of the plate 4a opposite to the pressurization chamber surface 4-2.

In this case, for example, because the dummy pressurization chambers 16 are directly connected to each other, it is easy to provide the communication path 19, compared with a configuration such that the dummy descenders 17 are directly connected to each other and the dummy pressurization chambers 16 are indirectly connected to each other (this configuration is also included in the technology according to the present disclosure). For example, it is possible to form the communication path 19 that connects the dummy pressurization chambers 16 that overlap the manifold 5 in plan view to each other in any appropriates shape (for example, a shape that provides a shortest route) on the manifold 5. For example, because the thickness of a portion the channel member 4 below the manifold 5 is generally smaller than the thickness of a portion of the channel member 4 above the manifold 5, it is easy form the communication path 19 having a sufficient thickness, compared with a configuration such that the communication path is formed below the manifold 5 (this configuration is also included in the technology according to the present disclosure). In relation to this, although the communication path 19 may exert an effect on the operation of a damper (not shown) when the communication path 19 and the dumper are disposed in the thin portion below the manifold 5, such a drawback is reduced when the communication path 19 and the dumper (not shown) are disposed in the thick portion above the manifold 5.

Moreover, because a concave groove is formed in a surface of the plate 4a opposite to the pressurization chamber surface 4-2, compared with a configuration such that a communication path is constituted by a concave groove formed in the pressurization chamber surface 4-2 or a hole (through groove) formed in the plate 4a (this configuration is also included in the technology according to the present disclosure), it is possible to make the state of a region of the pressurization chamber surface 4-2 on the dummy pressurization chamber 16 be the same as the state of a region of the pressurization chamber surface 4-2 on the pressurization chamber 10. As a result, for example, it is possible to make the effect that a region of the pressurization chamber surface 4-2 around the dummy pressurization chamber 16 exerts on the dummy pressurization portion 36 be close to the effect that a region of the pressurization chamber surface 4-2 around the pressurization chamber 10 exerts on the pressurization portion 30. By extension, it becomes easier to reproduce structural crosstalk between the ejection elements 3 by using the dummy ejection element 14, and it is possible to reduce variation in ejection characteristics of the plurality of ejection elements 3 near the outer periphery of the region A1. To be specific, for example, when joining the channel member 4 and the actuator substrate 21 by using a thermosetting resin or the like, stress is generated due the difference in contraction between the channel member 4 and the actuator substrate 21 when being cooled. It is possible to make the stress uniform inside and outside of the region A1.

In the present embodiment, the plurality of communication paths 19 includes a communication path that connects positions in the dummy pressurization chamber 16 that are adjacent to each other, the positions being closest to each other, with a straight line. That is, the communication path 19 is positioned and shaped to provide a shortest route.

Accordingly, for example, it is possible to reduce decrease of the rigidity of the channel member 4 due to forming of the plurality of communication paths 19. Here, decrease of the rigidity of the channel member 4 on the outer peripheral side is reduced, because the dummy pressurization chamber 16 is disposed outside of the region A1 in which the plurality of pressurization chambers 10 is disposed. The head body 2a is usually coupled to and supported by another member on the outer peripheral side. By extension, a relatively large force is applied to the outer peripheral side. Accordingly, decrease of the rigidity of the outer peripheral side of the channel member is reduced, thereby, for example, the probability of deformation of the head body 2a is effectively reduced, and the probability of decrease of the positioning accuracy of the head body 2a due to deformation of the head body 2a is also reduced.

The channel member 4 includes the first route r1 and the second route r2. The first route r1 includes at least one communication path 19, and connects predetermined or any two dummy pressurization chambers 16 to each other. The second route r2 includes at least one other communication path 19, bypasses the first route r1, and connects the two dummy pressurization chambers 16 to each other.

Accordingly, for example, even if ink enters the channel member 4 and solidifies and one of the first route r1 and the second route r2 is blocked, it is expected that the other route maintains connection. As a result, the probability of forming of a relatively small closed space that is composed of only one (or a small number of) dummy pressurization chamber(s) 16 due to entry of ink is reduced.

In the present embodiment, the second route r2 includes at least one dummy pressurization chamber 16 other than the aforementioned two dummy pressurization chambers 16.

Accordingly, it is possible to increase the number of parallel routes while suppressing increase of the volume of the communication path 19, compared with a configuration such that two routes are constituted by two communication paths 19 that directly and parallelly connect two dummy pressurization chambers 16 (this configuration is also included in the technology according to the present disclosure). As a result, for example, it is possible to reduce the probability of forming of a small closed space due to clogging of ink while reducing the probability of decrease of the rigidity of the channel member 4.

In the present embodiment, the channel member 4 includes a plurality of regions A1 in which the pressurization chambers 10 are arranged. The plurality of dummy pressurization chambers is arranged in such a way as to surround each of the plurality of region A1.

Accordingly, it is possible to provide the regions A1 in any appropriate number and/or with any appropriate shape, because the probability of occurrence of variation in ejection characteristics is reduced on the outer peripheral side of the regions A1. That is, the freedom in design of the region A1 is improved. As a result, for example, it becomes easier to reduce the wiring density of the signal transmitter 60 by dividing the area in which a plurality of pressurization chambers 10 is arranged into an appropriate number of regions A1.

In the present embodiment, two or more (three, in the example shown in the figures) dummy pressurization chambers 16 are arranged in succession to the pressurization chamber column 11, and/or two or more (three, in the example shown in the figures) dummy pressurization chambers 16 are arranged in succession to the pressurization chamber row 13.

By arranging two or more dummy ejection elements 14 in succession to the arrangement of the ejection element 3 in this way, the advantageous effect of reducing variation in ejection characteristics due to structural crosstalk is improved. To be specific, the improvement is as follows.

Figure 9A:
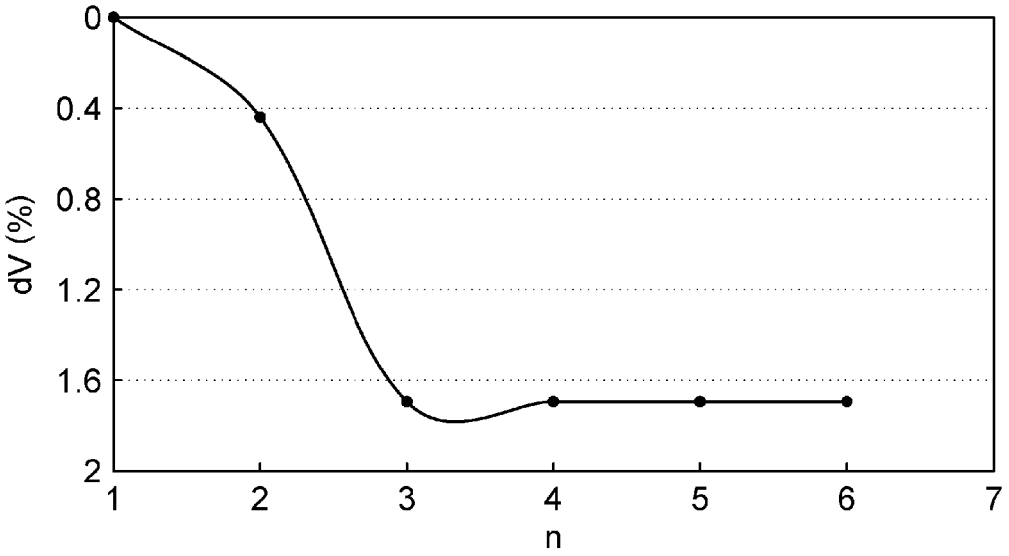
FIG. 9A and FIG. 9B are graphs representing the effect that the number of ejection elements exerts on structural crosstalk.

FIG. 9A is a graph representing the effect that the number of ejection elements 3 exerts on structural crosstalk. This figure is obtained by experiment. The horizontal axis n represents the number of ejection elements 3. The value "1" on the horizontal axis represents a state in which only one ejection element 3 (hereafter, referred to as "focused-on element") is driven. The value "2" on the horizontal axis represents a state in which, in addition to the focused-on element, an ejection element 3 positioned adjacent to the focused-on element is driven. The value "3" on the horizontal axis represents a state in which, in addition to the focused-on element and the ejection element 3 of "2" described above, an ejection element 3 positioned adjacent to the ejection element 3 of "2" is driven. In this way, the value n on the horizontal axis represents a state in which the focused-on element and (n−1) ejection elements 3 that are arranged on one side of the focused-on element at a constant pitch are driven. The vertical axis dV (%) represents the rate of decrease in the ejection speed of the focused-on element with reference to the ejection speed of the focused-on element when n=1. Accordingly, for example, dV (%)=0 for n=1. For example, dV (%)=0.4 for n=2 means that the ejection speed of the focused-on element is 0.4% lower than the ejection speed of the focused-on element when only the focused-on element is driven.

As illustrated in this figure, the ejection speed of the focused-on element decreases when one ejection element 3 adjacent to the focused-on element is driven (n=2), and further decreases when a further adjacent ejection element 3 is driven (n=3). However, when more than three ejection elements 3 are driven, the ejection speed does not change considerably.

Figure 9B:
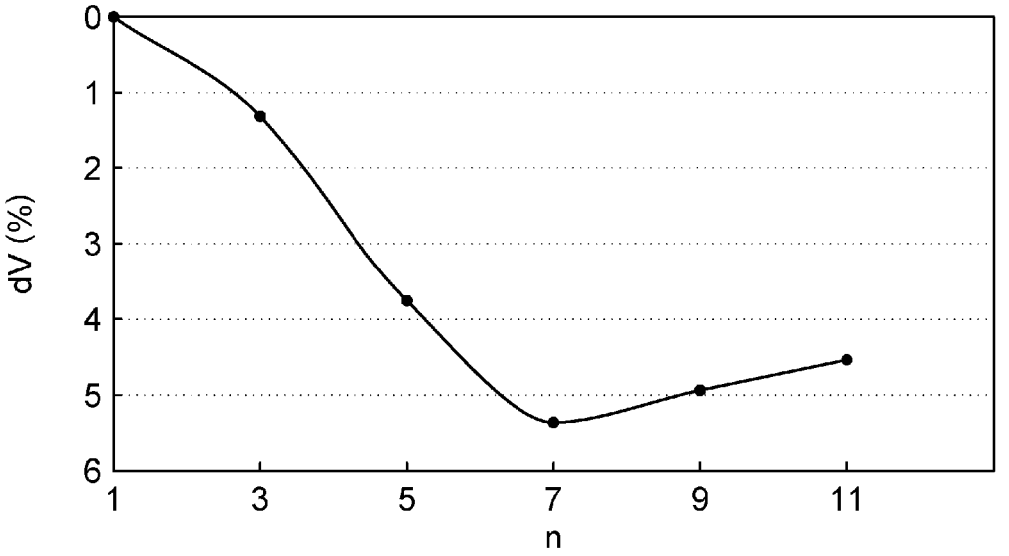

FIG. 9B is a view similar to FIG. 9A. However, here, ejection elements 3 on both sides of the focused-on element are driven. For example, as with FIG. 9A, the value "1" on the horizontal axis represents a state in which only the focused-on element is driven. The value "3" on the horizontal axis represents a state in which, in addition to the focused-on element, two ejection elements 3 on both sides of the focused-on element are driven. The value "5" on the horizontal axis represents a state in which, in addition to the focused-on element and the two ejection elements 3 of "3" described above, two ejection elements 3 on both sides thereof are driven.

As illustrated in this figure, the ejection speed of the focused-on element decreases when the two ejection elements 3 on both sides of the focused-on element are driven (n=3), further decreases when the ejection elements 3 on further both sides are driven (n=5), and further decreases when the ejection elements 3 on further both sides are driven (n=7). However, when more than seven ejection elements 3 are driven, the ejection speed does not change considerably.

From these results, it can be confirmed that the advantageous effect of reducing the effect of structural crosstalk is improved by arranging two or more dummy ejection elements 14 in succession to a column or a row of ejection elements 3. From FIG. 9B, it is possible to reduce the number of dummy ejection elements 14 while sufficiently reproducing structural crosstalk in a central part of the region A1, by arranging three dummy ejection elements 14 in succession to a column or a row of ejection elements 3. From the above, when arranging dummy ejection elements 14 in succession to a column or a row of ejection elements 3, the number of dummy ejection elements 14 may be two or more and four or less, or may be three.

In the embodiment described above, the ejection hole surface 4-1 is an example of a first surface. The pressurization chamber surface 4-2 is an example of a second surface. The region A1 is an example of a predetermined region. The plate 4a is an example of a cavity plate.

[Modifications]

Hereafter, various modifications will be described. In the description of the modifications, basically, only the differences from the embodiment will be described. Matters that are not specifically described are the same as those of the embodiment.

(First Modification)

Figure 10:
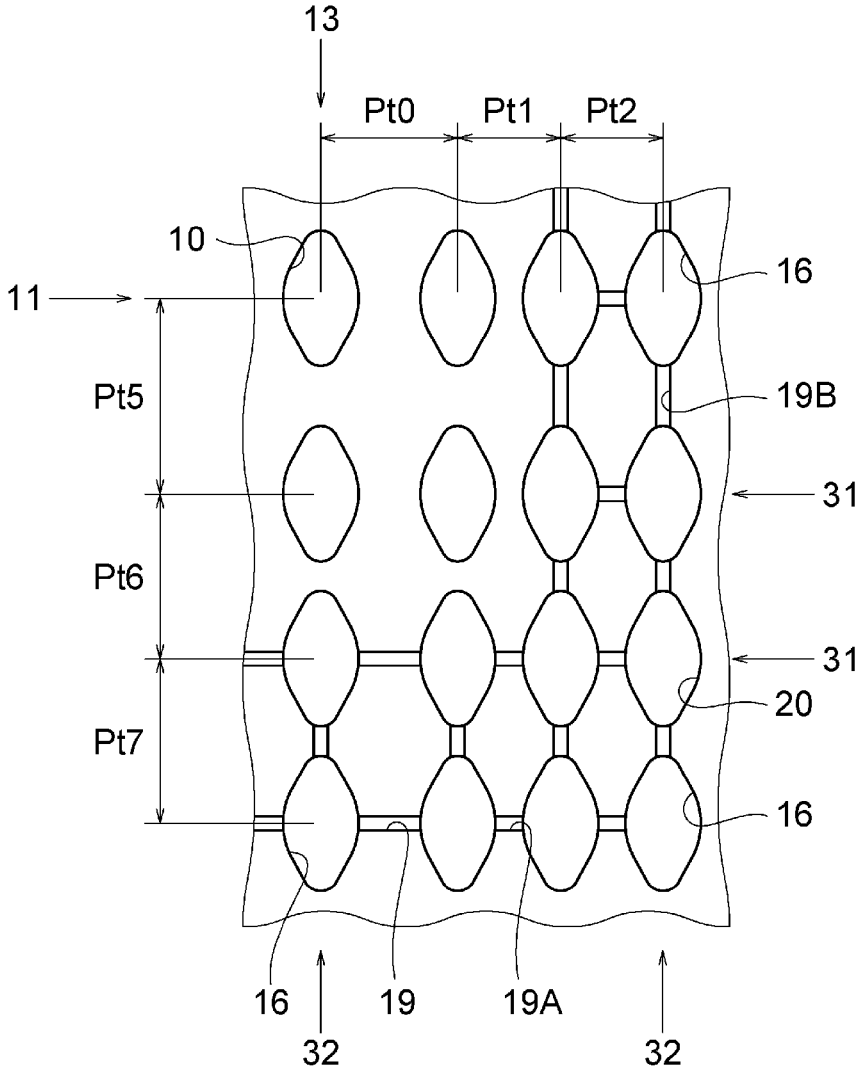
FIG. 10 is a schematic view illustrating a head according to a first modification.

FIG. 10 is a schematic view of a head according to a first modification, illustrating an area substantially the same as FIG. 7.

In this modification, the pitch Pt1 between the pressurization chamber 10 positioned at an end of the pressurization chamber column 11 and the dummy pressurization chamber 16 adjacent to the pressurization chamber 10 in the direction of the pressurization chamber column 11 is smaller than the pitch Pt0 between the pressurization chambers 10 in the pressurization chamber column 11. The pitch Pt2 between the dummy pressurization chambers 16 arranged in succession to (serial to) the pressurization chamber column 11 is smaller than the pitch Pt0 of the pressurization chambers 10 in the dummy pressurization chamber column 31. Either of the pitch Pt1 and the pitch Pt2 may be larger than the other, and, for example, the pitch Pt2 is smaller than or equal to the pitch Pt1.

When the pitch Pt1 and/or the pitch Pt2 is made smaller than the pitch Pt0 in this way, the dummy ejection element 14 becomes closer to the ejection element 3, and the effect of structural crosstalk that the dummy ejection element 14 exerts on the ejection element 3 increases. As a result, for example, it is possible to reduce the number of dummy pressurization chambers 16 arranged in succession to the pressurization chamber column 11 (from another viewpoint, the number of dummy pressurization chamber rows 32 arranged parallel to the pressurization chamber rows 13). In the example illustrated in the figure, the number of dummy pressurization chamber rows 32 that are parallel to the pressurization chamber rows 13 is two, which is smaller by one than the number of rows in the embodiment.

The pitch is, for example, the distance in plan view between the centroids of the pressurization chambers 10 and/or the dummy pressurization chambers 16 in the direction in which the pressurization chambers 10 are arranged in the pressurization chamber column 11 and/or in the direction in which the dummy pressurization chambers 16 are arranged in the dummy pressurization chamber column 31. Note that the centroid is a point such that the geometric moment of area with respect to any axis passing through the point is zero. The same applies to other pitches described below.

Although the pitch of the dummy pressurization chambers 16 arranged in succession to the pressurization chamber column 11 has been described, similar modification may be made also in the pitch of the dummy pressurization chambers 16 arranged in succession to the pressurization chamber row 13. For example, the pitch Pt6 between the pressurization chamber 10 positioned at an end of the pressurization chamber row 13 and the dummy pressurization chamber 16 adjacent to the pressurization chamber in the direction of the pressurization chamber row 13 is smaller than the pitch Pt5 of the pressurization chambers 10 in the pressurization chamber row 13. The pitch Pt7 of the dummy pressurization chambers 16 that are arranged in succession to (serial to) the pressurization chamber row 13 is smaller than the pitch Pt5 of the pressurization chambers 10 in the dummy pressurization chamber row 32. Either of the pitch Pt6 and the pitch Pt7 may be larger than the other, and, for example, the pitch Pt7 is smaller than or equal to the pitch Pt6.

Also when the pitch Pt6 and/or the pitch Pt7 are/is made smaller than the pitch Pt5 in this way, an advantageous effect that is the same as that when the pitch Pt1 and/or the pitch Pt2 are/is made smaller than the pitch Pt0 can be obtained. That is, the effect of structural crosstalk that the dummy ejection element 14 exerts on ejection element 3 can be increased. As a result, for example, it is possible to reduce the number of dummy pressurization chambers 16 arranged in succession to the pressurization chamber row 13 (from another viewpoint, the number of dummy pressurization chamber columns 31 arranged parallel to the pressurization chamber columns 11). In the example illustrated in the figure, the number of dummy pressurization chamber columns 31 that are parallel to the pressurization chamber columns 11 is two, which is smaller by one than the number of columns in the embodiment.

Although both of the pitch Pt1 and the pitch Pt2 are smaller than the pitch Pt0 in the modification illustrated in the figure, only one of these may be smaller than the pitch Pt0. When three or more dummy pressurization chambers 16 are arranged in succession to the pressurization chamber column 11, and, by extension, two or more pitches Pt2 exist, all of the pitches Pt2 may be smaller than the pitch Pt0, or some (at least one) of the pitches Pt2 may be smaller than the pitch Pt0. The same applies to the pitches Pt5 to Pt7. That is, only one of the pitch Pt6 and the pitch Pt7 may be smaller than the pitch Pt5; and, when a plurality of pitches Pt7 exists, all of the pitches Pt7 may be smaller than the pitch Pt5, or some (at least one) of the pitches Pt7 may be smaller than the pitch Pt5. In the modification illustrated in the figure, the pitch is changed in both of column and row. However, the pitch may be changed in only one of these.

In the first modification (and in the second modification described below), each of the pressurization chambers 10 in any pressurization chamber column 11 and each of the dummy pressurization chambers 16 arranged in succession to the pressurization chamber column 11 are respectively an example of a first pressurization chamber and an example of a first dummy pressurization chamber. Each of the pressurization chambers 10 in any pressurization chamber row 13 and each of the dummy pressurization chambers 16 arranged in succession to the pressurization chamber row 13 are also respectively an example of a first pressurization chamber and an example of a first dummy pressurization chamber.

(Second Modification)

Figure 11:
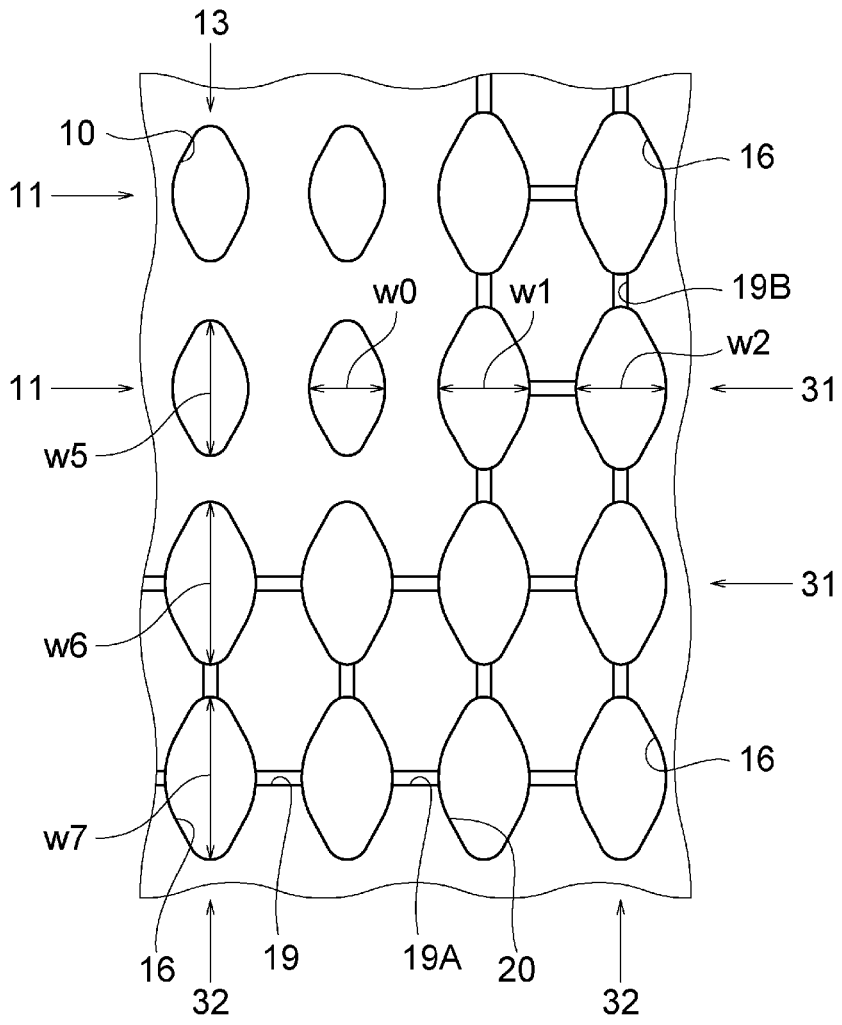
FIG. 11 is a schematic view illustrating a head according to a second modification.

FIG. 11 is a schematic view of a head according to a second modification, illustrating an area substantially the same as FIG. 7.

In this modification, the width w1 and width w2 of one or more (two, in the example shown in the figures) dummy pressurization chambers 16 arranged in succession to the pressurization chamber column 11 in a direction parallel to the pressurization chamber column 11 are larger than the width w0 of the pressurization chamber 10 in the direction parallel to the pressurization chamber column 11. Among two or more dummy pressurization chambers 16 arranged in succession to the pressurization chamber column 11, either of the width w1 of the dummy pressurization chamber 16 on the pressurization chamber column 11 side and the width w2 of the dummy pressurization chamber 16 on a side opposite to the pressurization chamber column 11 may be larger than the other, and, for example, the width w2 is larger than or equal to the width w1.

When the width w1 and/or the width w2 are/is made larger than the width w1 in this way, the distance (the distance of a gap, not the pitch) between the dummy ejection element 14 and the ejection element 3 decreases, and the effect of structural crosstalk that the dummy ejection element 14 exerts on the ejection element 3 increases. As a result, for example, it is possible to reduce the number of dummy pressurization chambers 16 arranged in succession to the pressurization chamber column (from another viewpoint, the number of dummy pressurization chamber rows 32 arranged parallel to the pressurization chamber rows 13). In the example illustrated in the figure, the number of dummy pressurization chamber rows 32 that are parallel to the pressurization chamber rows 13 is two, which is smaller by one than the number of rows in the embodiment.

The width of the pressurization chamber 10 and/or the dummy pressurization chamber 16 in the direction parallel to the pressurization chamber column 11 and/or the dummy pressurization chamber column 31 may be compared with reference to, for example, the maximum width in the direction. For example, when the shape of the pressurization chamber 10 and/or the dummy pressurization chamber 16 is a rhombus having diagonal lines in the column direction and the row direction, the maximum width in the column direction is the length of a diagonal line parallel to the column direction. Likewise, for the width in the other direction described below, the maximum width may be used as a reference.

Although the width of the dummy pressurization chambers 16 arranged in succession to the pressurization chamber column in the direction parallel to the pressurization chamber column 11 has been described, similar modification may be made also in the width of the dummy pressurization chambers 16 arranged in succession to the pressurization chamber row 13 in the direction parallel to the pressurization chamber row 13. For example, the width w6 and width w7 of one or more (two, in the example shown in the figure) pressurization chambers 16 arranged in succession to the pressurization chamber row 13 in the direction parallel to the pressurization chamber row 13 are larger than the width w5 of the pressurization chamber 10 in the direction parallel to the pressurization chamber row 13. Among the two or more dummy pressurization chambers 16 arranged in succession to the pressurization chamber row 13, either of the width w6 of the dummy pressurization chamber 16 on the pressurization chamber row 13 side and the width w7 of the dummy pressurization chamber 16 on a side opposite to the pressurization chamber row 13 may be larger than the other, and, for example, the width w7 is larger than or equal to the width w6.

Also when the width w6 and/or width w7 are/is made larger than the width w5 in this way, an advantageous effect that is the same as that when the width w1 and/or the width w2 are/is made smaller than the width w0 can be obtained. That is, the effect of structural crosstalk that the dummy ejection element 14 exerts on ejection element 3 can be increased. As a result, for example, it is possible to reduce the number of dummy pressurization chambers 16 arranged in succession to the pressurization chamber row 13 (from another viewpoint, the number of dummy pressurization chamber columns 31 arranged parallel to the pressurization chamber columns 11). In the example illustrated in the figure, the number of dummy pressurization chamber columns 31 that are parallel to the pressurization chamber columns 11 is two, which is smaller by one than the number of columns in the embodiment.

In the modification illustrated in the figure, all of the widths of two or more dummy pressurization chambers 16 arranged in succession to the pressurization chamber column 11 (here, w1 and w2) are larger than the width w0 of the pressurization chamber 10. However, only some (at least one) of the widths may be larger than the width w0. Likewise, only some (at least one) of the widths of two or more dummy pressurization chambers 16 (here, w6 and w7) arranged in succession to the pressurization chamber row 13 may be larger than the width w5. In the modification illustrated in the figure, the width is changed in both of column and row. However, the width may be changed in only one of these.

(Third Modification)

Figure 12:
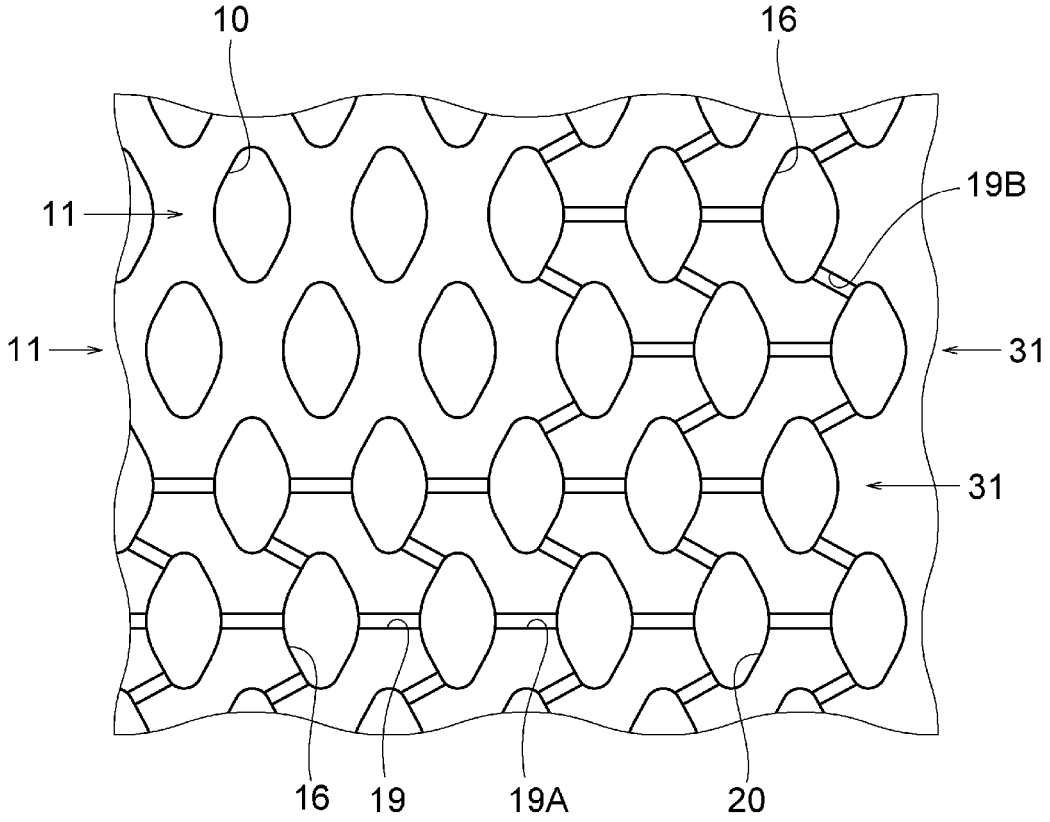
FIG. 12 is a schematic view illustrating a head according to a third modification.

FIG. 12 is a schematic view of a head according to a third modification, illustrating an area substantially the same as FIG. 7.

In this modification, between the pressurization chamber columns 11 that are adjacent to each other, the positions of the pressurization chambers 10 in the direction parallel to the pressurization chamber column 11 are displaced from each other by half the pitch. That is, whereas the plurality of pressurization chambers 10 is arranged in a matrix pattern in the embodiment, the plurality of pressurization chambers 10 is arranged in a staggered pattern in this modification. Likewise, for the dummy pressurization chamber column 31, between the dummy pressurization chamber columns 31 that are adjacent to each other, the positions of the dummy pressurization chambers 16 in the direction parallel to the dummy pressurization chamber column 31 are displaced from each other by half the pitch.

As in the embodiment, among the plurality of communication paths 19, the communication path 19A connects the dummy pressurization chambers 16 that are adjacent to each other in the dummy pressurization chamber column 31 in the shortest distance. When the plurality of dummy pressurization chambers 16 arranged in the direction perpendicular to the dummy pressurization chamber column 31 in a meandering (staggered) manner are regarded as being arranged in one row, the communication path 19B connects the dummy pressurization chambers 16 that are adjacent to each other in the row in the shortest distance.

(Fourth Modification)

Figure 13:
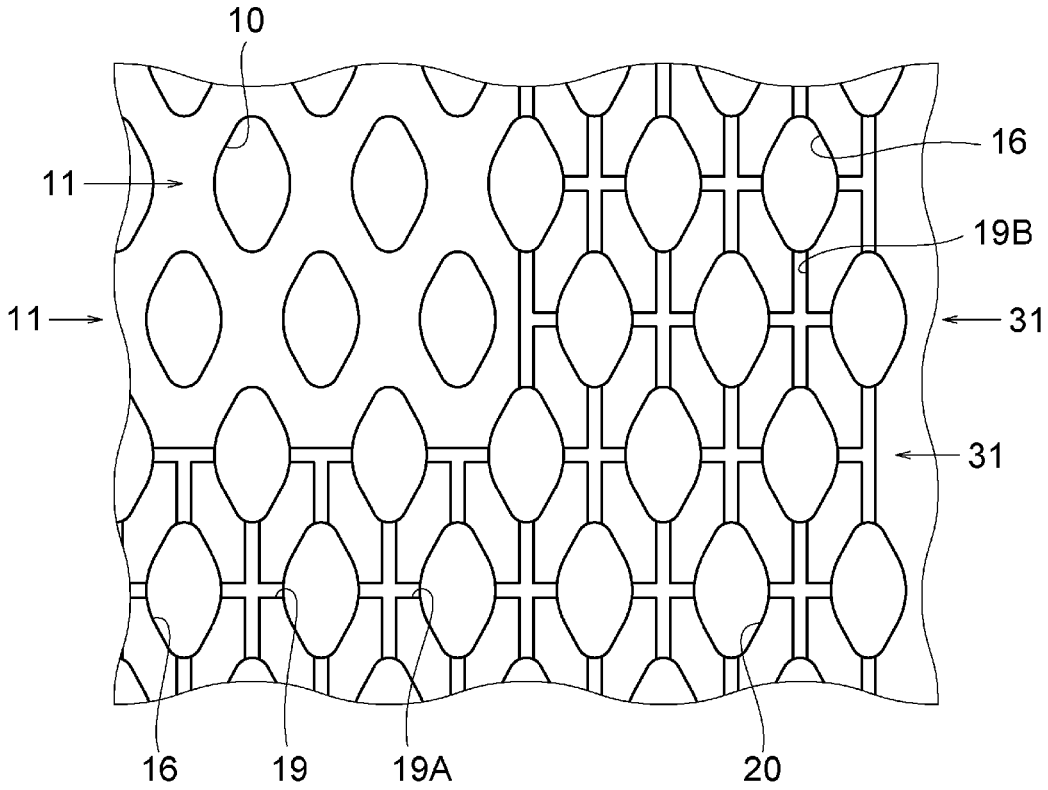
FIG. 13 is a schematic view illustrating a head according to a fourth modification.

FIG. 13 is a schematic view of a head according to a fourth modification, illustrating an area substantially the same as FIG. 7.

In this modification, the dispositions of the pressurization chambers 10 and the dummy pressurization chambers 16 are the same as those in the third modification. As in the third modification, among the plurality of communication paths 19, the communication path 19A connects the dummy pressurization chambers 16 that are adjacent to each other in the dummy pressurization chamber column 31 in the shortest distance. On the other hand, in contrast to the third modification, when a plurality of dummy pressurization chambers 16 arranged in the direction perpendicular to the dummy pressurization chamber column 31 are regarded as being arranged in one row, the communication path 19B connects the dummy pressurization chambers 16 that are adjacent to each other in the row in the shortest distance. The communication path 19A and the communication path 19B intersect each other, and are connected to each other.

In this modification, two dummy pressurization chambers 16 that are adjacent to each other in a diagonal direction are connected to each other via two routes that are parallel (one of which bypasses the other) and that are composed of only the communication paths 19. In this way, two parallel routes that connect two predetermined dummy pressurization chambers 16 to each other need not pass through the dummy pressurization chamber 16. When an L-shape composed of a half of the communication path 19A and a half of the communication path 19B is regarded as one communication path, two routes that are parallel to each other can each be regarded as an example including only one communication path.

(Fifth Modification)

Figure 14:
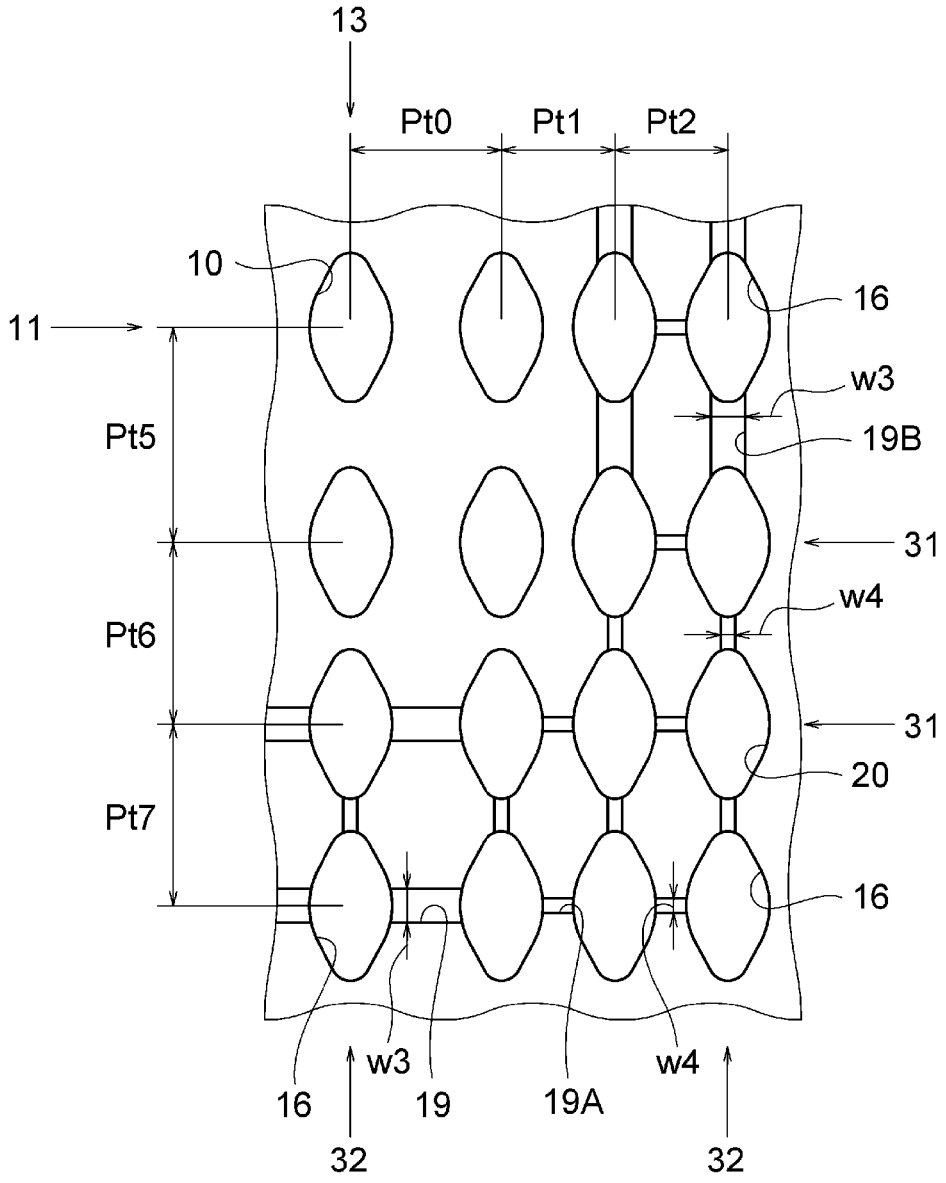
FIG. 14 is a schematic view illustrating a head according to a fifth modification.

FIG. 14 is a schematic view of a head according to a fifth modification, illustrating an area substantially the same as FIG. 7.

In this modification, the pitch between the plurality of dummy pressurization chambers 16 adjacent to each other differ. By extension, the lengths of the communication paths 19A differ from each other, and the lengths of the communication paths 19B differ from each other. The widths of the plurality of communication paths 19 differ from each other in accordance with the lengths thereof. To be specific, among the plurality of communication paths 19A, the width w3 of the communication path 19A that is relatively long is larger than the width w4 of the communication path 19A that is relatively short. Likewise, among the plurality of communication paths 19B, the width w3 of the communication path 19B that is relatively long is larger than the width w4 of the communication path 19B that is relatively short. In the description of the present modification, it is assumed that the magnitude relationship among the widths of the communication paths 19 is the same as the magnitude relationship among the cross-sectional areas of the communication paths 19.

By making the width w3 of the long communication paths 19A and 19B larger than the width w4 of the short communication paths 19A and 19B in this way, for example, it is possible to relieve pressure more evenly between the plurality of dummy pressurization chambers 16, and it is possible to further reduce variation in ejection characteristics due to structural crosstalk.

Although not illustrated in the figure, when the length differs in three steps, the width may differ in three steps. The same applies to four or more steps. The above relationship between the length and the width may hold for all of the communication paths 19A or may hold for some of the communication paths 19A. The same applies to the communication paths 19B. Heretofore, the relationship between the length and the width in the plurality of communication paths 19A, and the relationship between the length and the width in the plurality of communication paths 19B have been described. Also when the communication path 19A and the communication path 19B are compared, a longer path may have a larger width than a shorter path.

In the fifth modification, the communication path 19 having the width w4 is an example of a first communication path, and the communication path 19 having the width w3 is an example of a second communication path.

The technology according to the present disclosure technology is not limited to the embodiment and modifications described above, and may be carried out in various configurations.

For example, the modifications described above may be combined in any appropriate way. For example, both of the pitch of dummy pressurization chambers according to the first modification (FIG. 10) and the width of the dummy pressurization chambers according to the second modification (FIG. 11) may be used. The pitch and/or width may be applied to the third or fourth modification (FIG. 12 or FIG. 13). In the description of the fifth modification (FIG. 14), the dispositions of the pressurization chambers 10, the dummy pressurization chambers 16, and the communication paths 19 according to the first modification (FIG. 10) have been used as an example. However, the relationship between the length and the width of the communication path in the fifth modification may be applied to a combination of two or more of the second to fourth modifications and a combination of two or more of the first to fourth modifications.

The shapes of the common channel (manifold) and the individual channels (throttle, pressurization chamber, descender, and through-hole) described in the embodiment, the arrangement of the pressurization chambers and the ejection holes, and the like are merely examples. For example, the common channel may extend, instead of the direction perpendicular to the relative movement of head and the recording medium, a direction that is inclined at an obtuse angle or an acute angle with respect to the direction of the relative movement. The same applies to the pressurization chambers arranged along the common channel. The arrangement of the pressurization chambers and/or the ejection holes may be slightly displaced intentionally (not due to a tolerance) from a constant-pitch linear arrangement.

The channel member may include, in addition to the piezoelectric ceramic layer 21a, a plate that closes the pressurization chambers. However, in this case, it may be regarded that the plate is a part of the actuator substrate 21 and the pressurization chambers are closed by the actuator substrate.

The head is not limited to a head including two-dimensionally arranged ejection elements, and may be a head including one-dimensionally arranged ejection elements. In this case, for example, the dummy pressurization chambers are disposed on both sides in the arrangement direction. When the head includes the ejection elements that are arranged two-dimensionally in a predetermined region, the dummy pressurization chambers need not surround the predetermined region. For example, dummy pressurization chambers may be disposed on both sides only in one of the column direction and the row direction on which the effect of structural crosstalk is large.

REFERENCE SIGNS LIST

2 head
2a head body
4 channel member
4-1 ejection hole surface (first surface)
4-2 pressurization chamber surface (second surface)
8 ejection hole
10 pressurization chamber
16 dummy pressurization chamber
19 communication path
20 closed space

21 actuator substrate
30 pressurization portion
36 dummy pressurization portion

The invention claimed is:

1. A liquid ejection head comprising:

a channel member comprising a first surface and a second surface opposite to the first surface, a plurality of ejection holes opening in the first surface, a plurality of pressurization chambers individually communicating with the plurality of ejection holes and arranged in a predetermined region in a plan view of the second surface, a plurality of dummy pressurization chambers positioned outside of the predetermined region in the plan view of the second surface; and an actuator substrate overlapping the second surface of the channel member, comprising a plurality of pressurization portions that individually pressurizes the plurality of pressurization chambers[, and a plurality of dummy pressurization portions that individually pressurizes the plurality of dummy pressurization chambers];

wherein the plurality of dummy pressurization chambers communicates with each other via a plurality of communication paths, and wherein a closed space comprising the plurality of dummy pressurization chambers and the plurality of communication paths is hermetically closed.

2. The liquid ejection head according to claim 1, wherein the channel member comprises a plurality of plates stacked from the first surface toward the second surface, wherein the plurality of plates comprises a cavity plate constituting the second surface, wherein the cavity plate comprises an opening, adjacent to the second surface, that is at least a part of each of the plurality of pressurization chambers and the plurality of dummy pressurization chambers, wherein the actuator substrate overlaps the second surface and closes the plurality of pressurization chambers and the plurality of dummy pressurization chambers, and wherein the plurality of communication paths comprises a communication path constituted by a concave groove positioned in a surface of the cavity plate opposite to the second surface.

3. The liquid ejection head according to claim 1, wherein the plurality of communication paths comprises a communication path that linearly connects positions in the *plurality of* dummy pressurization chambers that are adjacent to each other, the positions being closest to each other.

4. The liquid ejection head according to claim 1, wherein the channel member comprises a first route comprising at least one of the plurality of communication paths, the first route connecting a predetermined two dummy pressurization chambers of the plurality of dummy pressurization chambers to each other, and a second route comprising at least another of the plurality of communication paths, bypassing the first route, the second route connecting the predetermined two dummy pressurization chambers to each other.

5. The liquid ejection head according to claim 4, wherein the predetermined two dummy pressurization chambers are adjacent to each other, and wherein the second route comprises at least one of the dummy pressurization chambers other than the predetermined two dummy pressurization chambers.

[6. The liquid ejection head according to claim 1, wherein the plurality of pressurization chambers comprises a plurality of first pressurization chambers arranged in a predetermined direction parallel to the second surface, wherein the plurality of dummy pressurization chambers comprises one or more first dummy pressurization chambers arranged, in succession to the plurality of first pressurization chambers, on one side of the plurality of first pressurization chambers in the predetermined direction, and wherein a pitch between a first pressurization chamber of the plurality of first pressurization chambers, that is positioned at an end on the one side in the predetermined direction, and one of the first dummy pressurization chambers that is adjacent to the first pressurization chamber positioned at the end is smaller than a pitch of the plurality of first pressurization chambers.]

7. The liquid ejection head according to claim 1, wherein the plurality of pressurization chambers comprises a plurality of first pressurization chambers arranged in a predetermined direction parallel to the second surface, wherein the plurality of dummy pressurization chambers comprises a plurality of first dummy pressurization chambers arranged in succession to the plurality of first pressurization chambers on one side in the predetermined direction, and wherein a pitch of the plurality of first dummy pressurization chambers is smaller than a pitch of the plurality of first pressurization chambers.

[8. The liquid ejection head according to claim 1, wherein the plurality of pressurization chambers comprises a plurality of first pressurization chambers arranged in a predetermined direction parallel to the second surface, wherein the plurality of dummy pressurization chambers comprises one or more first dummy pressurization chambers arranged, in succession to the plurality of first pressurization chambers, on one side of the plurality of first pressurization chambers in the predetermined direction, and wherein a width of at least one of the one or more first dummy pressurization chambers in the predetermined direction is larger than a width of each of the plurality of first pressurization chambers in the predetermined direction.]

[9. The liquid ejection head according to claim 1 claim, wherein the plurality of communication paths comprises a first communication path, and a second communication path longer than the first communication path and having a cross-sectional area larger than a cross-sectional area of the first communication path.]

10. The liquid ejection head according to claim 1, wherein the channel member comprises a plurality of predetermined regions, and wherein the plurality of dummy pressurization chambers is arranged to surround each of the plurality of predetermined regions.

11. A recording device comprising:

the liquid ejection head according to claim 1; and a movement unit that moves the liquid ejection head and a recording medium relative to each other.

12. The recording device according to claim 11, comprising:

a head chamber in which the liquid ejection head is accommodated; and a controller, wherein the controller controls at least one of a temperature, a humidity, and an air pressure of an inside of the head chamber.

13. The recording device according to claim 11, comprising:

a coater that applies a coating agent to the recording medium.

14. The recording device according to claim 11, comprising:

a drier that dries the recording medium.

*15. The liquid ejection head according to claim 1,*

*wherein a size of at least one of the plurality of dummy pressurization chambers is different from a size of each of the plurality of pressurization chambers.*

*16. The liquid ejection head according to claim 15,*

*wherein the plurality of dummy pressurization chambers includes three or more dummy pressurization chambers, and the three or more dummy pressurization chambers are connected via communication paths that branch from each other among the plurality of communication paths.*

*17. The liquid ejection head according to claim 1, wherein the plurality of communication paths includes*

*a first communication path, and*

*a second communication path having a width broader than a width the first communication path.*

*18. The liquid ejection head according to claim 17,*

*wherein a length of the second communication path is longer than a length of the first communication path.*

*19. The liquid ejection head according to claim 18,*

*wherein the plurality of dummy pressurization chambers includes a first dummy pressurization chamber, a second dummy pressurization chamber and a third dummy pressurization chamber which communicates with each other via the first communication path and the second communication path.*

*20. The liquid ejection head according to claim 1, wherein the plurality of communication paths includes*

*a first communication path, and*

*a second communication path longer than the first communication path, and the second communication path connects the first communication path.*

*21. The liquid ejection head according to claim 20,*

*wherein, the second communication path having a cross-sectional area larger then a cross-sectional area of the first communication path.*

*22. The liquid ejection head according to claim 21,*

*wherein, the plurality of communication paths includes a third communication path connects a first dummy pressurization chamber of the plurality dummy pressurization chamber;*

*wherein, the third communication path having a cross-sectional area smaller than the cross-sectional area of the second communication path.*

*23. The liquid ejection head according to claim 22,*

*wherein a pitch between a first pressurization chamber of the plurality of pressurization chambers, that is positioned at an end on the one side in a predetermined direction, and the first dummy pressurization chamber that is adjacent to the first pressurization chamber positioned at the end is different from a pitch of the plurality of pressurization chambers.*

*24. The liquid ejection head according to claim 23,*

*wherein the pitch between the first pressurization chamber and the first dummy pressurization chamber is larger than the pitch between the first dummy pressurization chamber and another dummy pressurization chamber which is positioned opposite side to the first pressurization chamber with respect to the first dummy pressurization chamber in the predetermined direction.*

*25. The liquid ejection head according to claim 24,*

*wherein the first dummy pressurization chamber and said another chamber communicate with each other via the third communication path.*

*26. The liquid ejection head according to claim 25,*

*wherein a width of the first dummy pressurization chamber in the predetermined direction is different from a width of each of the plurality of pressurization chambers in the predetermined direction.*

* * * * *